(12) United States Patent
Itkowitz et al.

(10) Patent No.: US 9,030,411 B2
(45) Date of Patent: May 12, 2015

(54) APPARATUS AND METHODS FOR HAPTIC RENDERING USING A HAPTIC CAMERA VIEW

(71) Applicant: 3D Systems, Inc., Rock Hill, SC (US)

(72) Inventors: Brandon D. Itkowitz, Natick, MA (US); Loren C. Shih, Medford, MA (US); Marc Douglass Midura, Somerville, MA (US); Joshua E. Handley, Silver Spring, MD (US); William Alexander Goodwin, Cambridge, MA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 14/276,845

(22) Filed: May 13, 2014

(65) Prior Publication Data

US 2014/0333625 A1 Nov. 13, 2014

Related U.S. Application Data

(63) Continuation of application No. 11/169,271, filed on Jun. 28, 2005, now abandoned.

(60) Provisional application No. 60/584,001, filed on Jun. 29, 2004.

(51) Int. Cl.
*G06T 15/20* (2011.01)
*G06F 3/01* (2006.01)
*G06T 15/00* (2011.01)
(Continued)

(52) U.S. Cl.
CPC ............... *G06T 15/20* (2013.01); *G06F 3/016* (2013.01); *G06F 2203/012* (2013.01); *G06T 15/00* (2013.01); *G06T 19/006* (2013.01); *G06T 15/80* (2013.01); *G06T 2215/06* (2013.01)

(58) Field of Classification Search
CPC ......... G06T 15/20; G06T 15/80; G06T 15/00; G06T 19/006; G06T 2215/06; G06F 3/016; G06F 2203/012
USPC .................. 345/156, 419, 422, 581, 632–634
See application file for complete search history.

(56) References Cited

U.S. PATENT DOCUMENTS 3,846,826 A 11/1974 Mueller
4,868,761 A 9/1989 Hayashi
(Continued)

FOREIGN PATENT DOCUMENTS

EP 0364947 A2 4/1990
EP 0518648 A2 12/1992

OTHER PUBLICATIONS

Chih-Hao Ho, "Efficient Point-Based Rendering Techniques for Haptic Display of Virtual Objects", Proceedings of the Genetic and Evolutionary Computation Conference, vol. 8 No. 5 Oct. 1999 pp. 477-491.*

(Continued)

*Primary Examiner* — Liliana Cerullo

(57) ABSTRACT

The invention provides systems and methods for using a "haptic camera" within a virtual environment and for using graphical data from the haptic camera to produce touch feedback. The haptic camera obtains graphical data pertaining to virtual objects within the vicinity and along the trajectory of a user-controlled haptic interface device. The graphical data from the camera is interpreted haptically, thereby allowing touch feedback corresponding to the virtual environment to be provided to the user.

14 Claims, 15 Drawing Sheets

(51) Int. Cl.
*G06T 19/00* (2011.01)
*G06T 15/80* (2011.01)

(56) References Cited

U.S. PATENT DOCUMENTS

| | | | |
|---|---|---|---|
| 4,868,766 A | 9/1989 | Oosterholt | |
| 4,901,253 A | 2/1990 | Iwano et al. | |
| 5,027,292 A | 6/1991 | Rossignac et al. | |
| 5,265,197 A | 11/1993 | Kondo | |
| 5,273,038 A | 12/1993 | Beavin | |
| 5,304,884 A | 4/1994 | Kitajima et al. | |
| 5,321,622 A | 6/1994 | Snead et al. | |
| 5,388,199 A | 2/1995 | Kakazu et al. | |
| 5,428,715 A | 6/1995 | Suzuki | |
| 5,455,902 A | 10/1995 | Ellson et al. | |
| 5,479,593 A | 12/1995 | Brewer et al. | |
| 5,481,470 A | 1/1996 | Snead et al. | |
| 5,487,012 A | 1/1996 | Topholm et al. | |
| 5,497,452 A | 3/1996 | Shimizu et al. | |
| 5,515,078 A | 5/1996 | Greschler et al. | |
| 5,561,747 A | 10/1996 | Crocker et al. | |
| 5,561,748 A | 10/1996 | Niu et al. | |
| 5,576,727 A | 11/1996 | Rosenberg et al. | |
| 5,623,582 A | 4/1997 | Rosenberg | |
| 5,625,576 A | 4/1997 | Massie et al. | |
| 5,629,594 A | 5/1997 | Jacobus et al. | |
| 5,633,951 A | 5/1997 | Moshfeghi | |
| 5,649,076 A | 7/1997 | Nishizaka et al. | |
| 5,691,898 A | 11/1997 | Rosenberg et al. | |
| 5,701,140 A | 12/1997 | Rosenberg et al. | |
| 5,704,791 A | 1/1998 | Gillio | |
| 5,721,566 A | 2/1998 | Rosenberg et al. | |
| 5,751,289 A | 5/1998 | Myers | |
| 5,766,016 A | 6/1998 | Sinclair et al. | |
| 5,769,640 A | 6/1998 | Jacobus et al. | |
| 5,808,616 A | 9/1998 | Shimizu | |
| 5,815,154 A | 9/1998 | Hirschtick et al. | |
| 5,844,392 A | 12/1998 | Peurach et al. | |
| 5,999,187 A | 12/1999 | Dehmlow et al. | |
| 6,046,726 A | 4/2000 | Keyson | |
| 6,111,577 A | 8/2000 | Zilles et al. | |
| 6,115,046 A | 9/2000 | Chen et al. | |
| 6,120,171 A | 9/2000 | Shaikh | |
| 6,131,097 A | 10/2000 | Peurach et al. | |
| 6,191,796 B1 | 2/2001 | Tarr | |
| 6,308,144 B1 | 10/2001 | Bronfeld et al. | |
| 6,417,638 B1 | 7/2002 | Guy et al. | |
| 6,421,048 B1 | 7/2002 | Shih et al. | |
| 6,448,977 B1 | 9/2002 | Braun et al. | |
| 6,552,722 B1 | 4/2003 | Shih et al. | |
| 6,570,564 B1 | 5/2003 | Sowizral et al. | |
| 6,628,280 B2 | 9/2003 | Perry et al. | |
| 6,671,651 B2 | 12/2003 | Goodwin et al. | |
| 6,703,550 B2 | 3/2004 | Chu | |
| 6,704,694 B1 | 3/2004 | Basdogan et al. | |
| 6,773,408 B1 | 8/2004 | Acker et al. | |
| 6,792,398 B1 | 9/2004 | Handley et al. | |
| 6,803,928 B2 | 10/2004 | Bimber et al. | |
| 6,809,738 B2 | 10/2004 | Hubrecht et al. | |
| 6,822,635 B2 | 11/2004 | Shahoian et al. | |
| 7,050,955 B1 * | 5/2006 | Carmel et al. | 703/6 |
| 7,095,418 B2 | 8/2006 | Levene et al. | |
| 7,102,635 B2 | 9/2006 | Shih et al. | |
| 7,103,499 B2 | 9/2006 | Goodwin et al. | |
| 7,149,596 B2 | 12/2006 | Berger et al. | |
| 7,208,671 B2 | 4/2007 | Chu | |
| 7,212,203 B2 | 5/2007 | Payne | |
| 7,225,404 B1 | 5/2007 | Zilles et al. | |
| 7,382,378 B2 | 6/2008 | Levene et al. | |
| 7,411,576 B2 | 8/2008 | Massie et al. | |
| 7,432,910 B2 | 10/2008 | Shahoian | |
| 7,480,600 B2 | 1/2009 | Massie et al. | |
| 7,626,589 B2 | 12/2009 | Berger | |
| 7,710,415 B2 | 5/2010 | Jennings, Jr. et al. | |
| 7,714,836 B2 | 5/2010 | Rodomista et al. | |
| 7,864,173 B2 | 1/2011 | Handley et al. | |
| 7,889,209 B2 | 2/2011 | Berger et al. | |
| 7,990,374 B2 | 8/2011 | Itkowitz et al. | |
| 2002/0130820 A1 | 9/2002 | Sullivan | |
| 2005/0027643 A1 | 2/2005 | Amaitis et al. | |
| 2005/0243086 A1 | 11/2005 | Schechter et al. | |
| 2006/0202953 A1 | 9/2006 | Pryor et al. | |

OTHER PUBLICATIONS

Basdogan et al., Haptic rendering in virtual environments, Virtual Environment Handbook (2001).
Cowart, et al., Mastering Windows 3.1 Special Edition, Action from Japanese Patent Office, Application No. 7-510838, Chapter 11, SYBEX Inc. (1993).
International Search Report and Written Opinion for PCT/US2005/023218, dated Apr. 6, 2006.
Luciano et al., Realistic cross-platform haptic applications using freely-available libraries, Proceedings of the 12th Symposium on Haptic Interfaces for Virtual Environment and Teleoperator Systems, Chicago (2004).
Open Inventor 2.1 Performance Tips, : 4, 6 and 8, released (Apr. 1996).
Open Inventor 4.0 Release Notes: 5, released (Apr. 2003).
Otaduy et al. ,User-centric viewpoint computation for haptic exploration and manipulation, Proceedings on the Conference of Visualization '01, San Diego, : 311-318 (2001).
Thompson et al., Using modern graphics architectures for general-purpose computing: A framework and analysis, Proceedings of the 35th Annual IEEE/ACM International Symposium on Microarchitecture, 35 (2002).
Ware et al., Exploration and virtual control in virtual three dimensional environments, Proceedings of the 1990 Symposium on Interactive 3D Graphics, March: 175-183 (1990).

* cited by examiner

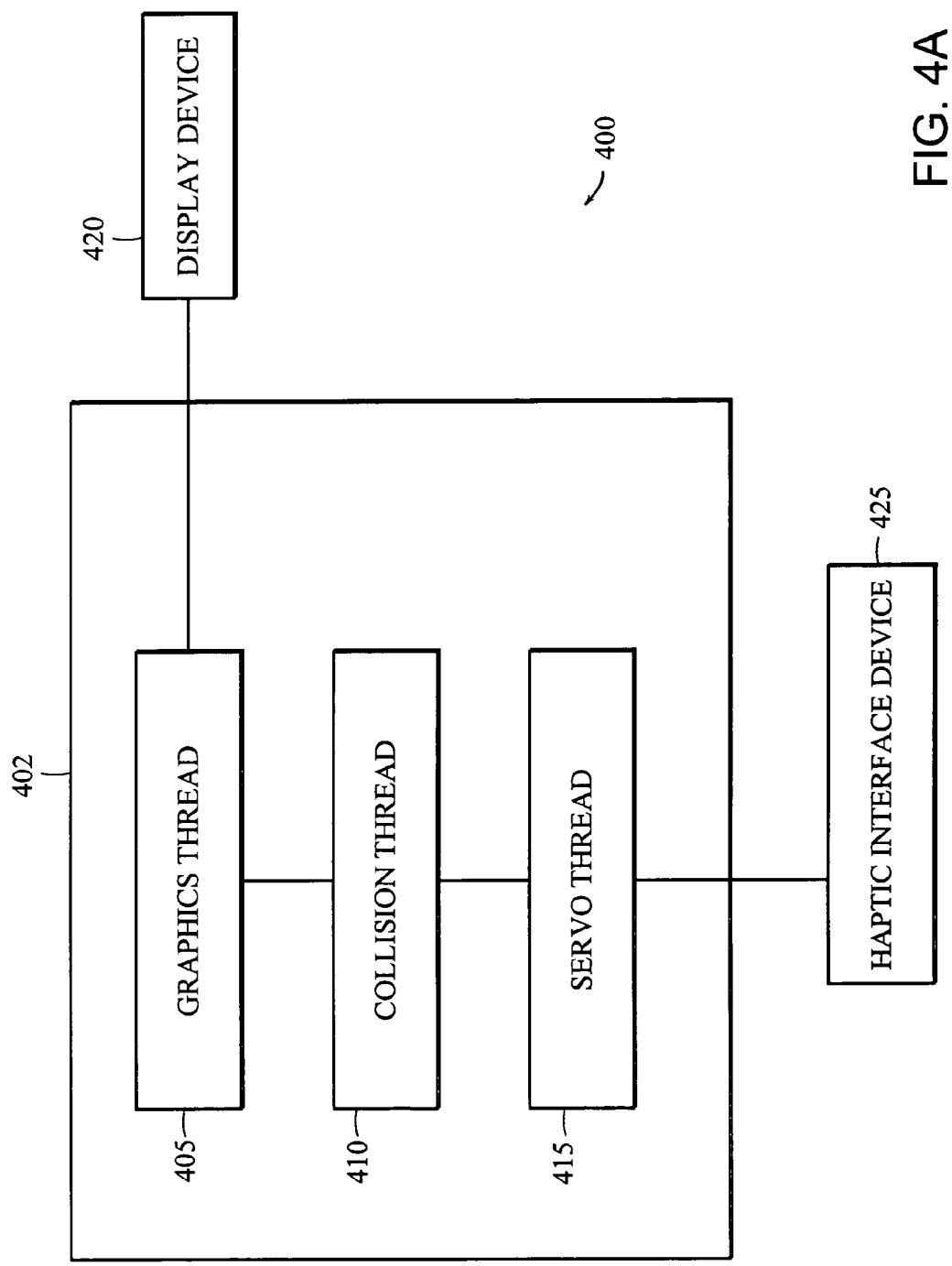

APPARATUS AND METHODS FOR HAPTIC RENDERING USING A HAPTIC CAMERA VIEW

RELATED APPLICATIONS

This application is a Continuation Application of and claims the benefit of U.S. patent application Ser. No. 11/169,271, which is filed Jun. 28, 2005, the entirety of which is incorporated by reference herein; the present application also claims the benefit of U.S. Provisional Patent Application No. 60/584,001, filed on Jun. 29, 2004, the entirety of which is incorporated by reference herein. The U.S. patent application Ser. No. 11/169,271 is related to commonly-owned U.S. patent application Ser. No. 11/169,175, entitled, "Apparatus and Methods for Haptic Rendering Using Data in a Graphics Pipeline," by Itkowitz, Shih, Midura, Handley, and Goodwin, the text of which is hereby incorporated by reference in its entirety; the U.S. patent application Ser. No. 11/169,271 is also related to commonly-owned international (PCT) patent application number PCT/US05/23218, entitled, "Apparatus and Methods for Haptic Rendering Using Data in a Graphics Pipeline," the text of which is hereby incorporated by reference in its entirety.

FIELD OF THE INVENTION

The invention relates generally to haptic rendering of virtual environments. More particularly, in certain embodiments, the invention relates to the haptic rendering of a virtual environment using data from the graphics pipeline of a 3D graphics application.

BACKGROUND OF THE INVENTION

Haptic technology involves simulating virtual environments to allow user interaction through the user's sense of touch. Haptic interface devices and associated computer hardware and software are used in a variety of systems to provide kinesthetic and/or tactile sensory feedback to a user in addition to conventional visual feedback, thereby affording an enhanced man/machine interface. Haptic systems are used, for example, in manufactured component design, surgical technique training, industrial modeling, robotics, and personal entertainment. An example haptic interface device is a six degree of freedom force reflecting device as described in co-owned U.S. Pat. No. 6,417,638, to Rodomista et al., the description of which is incorporated by reference herein in its entirety.

A haptic rendering process provides a computer-based kinesthetic and/or tactile description of one or more virtual objects in a virtual environment. A user interacts with the virtual environment via a haptic interface device. Analogously, a graphical rendering process provides a graphical description of one or more virtual objects in a virtual environment. Typically, a user interacts with graphical objects via a mouse, joystick, or other controller. Current haptic systems process haptic rendering data separately from graphical rendering data.

The graphical rendering of 3D virtual environments has been enhanced by the advent of 3D graphics application programming interfaces (APIs), as well as 3D graphics (video) cards. A programmer may create or adapt a 3D graphics application for rendering a 3D graphics virtual environment using the specialized libraries and function calls of a 3D graphics API. Thus, the programmer avoids having to write graphics rendering code that is provided in the API library. As a result, the task of programming a 3D graphics application is simplified. Furthermore, graphics standards have developed such that many currently-available 3D graphics applications are compatible with currently-available 3D graphics API's, allowing a user to adapt the 3D graphics application to suit his/her purpose. Examples of such 3D graphics API's include OpenGL, DirectX, and Java 3D.

In addition to 3D graphics API's, 3D graphics cards have also improved the graphical rendering of 3D virtual objects. A 3D graphics card is a specialized type of computer hardware that speeds the graphical rendering process. A 3D graphics card performs a large amount of the computation work necessary to translate 3D information into 2D images for viewing on a screen, thereby saving CPU resources.

While 3D graphics API's and graphics cards have significantly improved the graphical rendering of 3D objects, the haptic rendering of 3D objects in a virtual environment is a comparatively inefficient process. Haptic rendering is largely a separate process from graphical rendering, and currently-available 3D graphics applications are incompatible with haptic systems, since graphics applications are not designed to interpret or provide haptic information about a virtual environment.

Furthermore, haptic rendering processes are generally computation-intensive, requiring high processing speed and a low latency control loop for accurate force feedback rendering. For example, in order to realistically simulate touch-based interaction with a virtual object, a haptic rendering process must typically update force feedback calculations at a rate of about 1000 times per second. This is significantly greater than the update rate needed for realistic dynamic graphics display, which is from about 30 to about 60 times per second in certain systems. For this reason, current haptic systems are usually limited to generating force feedback based on single point interaction with a virtual environment. This is particularly true for haptic systems that are designed to work with widely-available desktop computers and workstations with state-of-the-art processors.

Thus, there is a need for increased efficiency in haptic rendering. Improvement is needed, for example, to facilitate the integration of haptics with currently-available 3D applications, to permit greater haptic processing speeds, and to enable the use of more sophisticated force feedback techniques, thereby increasing the realism of a user's interaction with a virtual environment.

SUMMARY OF THE INVENTION

The invention provides systems and methods for using a "haptic camera" within a virtual environment and for using graphical data from the haptic camera to produce touch feedback. The haptic camera obtains graphical data pertaining to virtual objects within the vicinity and along the trajectory of a user-controlled haptic interface device. The graphical data from the camera is interpreted haptically, thereby allowing touch feedback corresponding to the virtual environment to be provided to the user.

The efficiency of haptic rendering is improved, because the view volume can be limited to a region of the virtual environment that the user will be able to touch at any given time, and further, because the method takes advantage of the processing capacity of the graphics pipeline. This method also allows haptic rendering of portions of a virtual environment that cannot be seen in a 2D display of the virtual object, for example, the back side of an object, the inside of crevices and tunnels, and portions of objects that lie behind other objects.

A moving haptic camera offers this advantage. Graphical data from a static camera view of a virtual environment can be used for haptic rendering; however, it is generally true that only geometry visible in the view direction of the camera can be used to produce touch feedback. A moving camera (and/or multiple cameras) allows graphical data to be obtained from more than one view direction, thereby allowing the production of force feedback corresponding to portions of the virtual environment that are not visible from a single static view. The interaction between the user and the virtual environment is further enhanced by providing the user with a main view of the virtual environment on a 2D display while, at the same time, providing the user with haptic feedback corresponding to the 3D virtual environment. The haptic feedback is updated according to the user's manipulation of a haptic interface device, allowing the user to "feel" the virtual object at any position, including regions that are not visible on the 2D display.

The invention provides increased haptic rendering efficiency, permitting greater haptic processing speeds for more realistic touch-based simulation. For example, in one embodiment, the force feedback computation speed is increased from a rate of about 1000 Hz to a rate of about 10,000 Hz or more. Furthermore, the invention allows more sophisticated haptic interaction techniques to be used with widely-available desktop computers and workstations. For example, forces can be computed based on the interaction of one or more points, lines, planes, and/or spheres with virtual objects in the virtual environment, not just based on single point interaction. More sophisticated haptic interface devices that require multi-point interaction can be used, including pinch devices, multi-finger devices, and gloves, thereby enhancing the user's haptic experience. Supported devices include kinesthetic and/or tactile feedback devices. For example, in one embodiment, a user receives tactile feedback when in contact with the surface of a virtual object such that the user can sense the texture of the surface.

In one aspect of the invention, a method is provided for haptically rendering a virtual object in a virtual environment. The method includes determining a haptic interface location in a 3D virtual environment corresponding to a haptic interface device in real space. A first virtual camera is positioned at the haptic interface location, and graphical data corresponding to the virtual environment is accessed from this first virtual camera. Additionally, the method comprises determining a position of the haptic interface location in relation to one or more geometric features of a virtual object in the virtual environment—for example, a surface, point, line, or plane of (or associate with) the virtual object—by using graphical data from the first virtual camera. The method also includes determining an interaction force based at least in part on the position of the haptic interface location in relation to the geometric feature(s) of the virtual object. In one embodiment, the interaction force is delivered to a user through the haptic interface device. In a preferred embodiment, the position of the first camera is updated as the haptic interface location changes, according to movement of the haptic interface device.

The invention also provides a two-pass rendering technique using two virtual cameras. For example, the invention provides methods using a first virtual camera view dedicated for use in haptically rendering a 3D virtual environment and a second virtual camera view for graphically rendering the virtual environment for display. Accordingly, in one embodiment, the invention includes the steps of positioning a second virtual camera at a location other than the haptic interface location and accessing graphical data from the second virtual camera corresponding to the virtual environment. In one embodiment, the second virtual camera is at a fixed location, while the first virtual camera moves, for example, according to the movement of the haptic interface location.

Preferred methods of the invention leverage the processing capability of the graphics pipeline for haptic rendering. For example, graphical data corresponding to the view(s) from one or more virtual cameras is accessed from a graphics pipeline of a 3D graphics application. In one embodiment, the step of determining a position of the haptic interface location using data from the first virtual camera includes determining a world-view transformation that maps coordinates corresponding to the haptic virtual environment (i.e. world coordinates) to coordinates corresponding to the first virtual camera (i.e. view coordinates). The world-view transformation can be customized for translating and rotating the camera to view the scene as if attached to the position of the haptic device's proxy in the virtual environment (i.e. the haptic interface location). Additional transforms may be determined and/or applied, including a shape-world transformation, a view-clip transformation, a clip-window transformation, a view-touch transformation, and a touch-workspace transformation.

The invention also provides a method of determining what the view looks like from the "haptic camera." Generally, in order to specify a 3D world-view transformation, a camera eye position and a look direction are needed. Thus, in one embodiment, the step of determining a world-view transformation includes determining an eye position and a look direction. To determine the eye position, the position of the haptic interface location (i.e. the virtual proxy position) is sampled. In order to avoid undesirable jitter, the eye position is preferably updated only when the virtual proxy moves beyond a threshold distance from the current eye position. To determine the look direction, a vector representing the motion of the haptic interface location is determined. Preferably, the look direction is determined by the motion of the proxy and optionally by the contact normal, for example, if in contact with a virtual object and constrained on the surface of the contacted object. For example, when moving in free space, the look direction is the normalized motion vector. When in contact with a virtual object, the look direction becomes a linear combination of the normalized motion vector and the contact normal.

In one embodiment, a view volume associated with the first virtual camera is sized to exclude geometric elements that lie beyond a desired distance from the haptic interface location. This involves culling the graphical data to remove geometric primitives that lie outside the view volume of the first virtual camera. In one embodiment, hardware culling is employed, where primitives are culled by graphics hardware (i.e. a graphics card). In another embodiment, culling involves the use of a spatial partition, for example, an octree, BSP tree, or other hierarchical data structure, to exclude graphical data outside the view volume. Both hardware culling and a spatial partition can be used together. For example, where the number of primitives being culled by the graphics hardware is large, the spatial partition can reduce the amount of data sent to the hardware for culling, allowing for a more efficient process.

The types of graphical data obtained from the first virtual camera include, for example, data in a depth buffer, a feedback buffer, a color buffer, a selection buffer, an accumulation buffer, a texture map, a fat framebuffer, rasterization primitives, application programming interface input data, and/or state data.

As the term is used herein, a fat framebuffer is also known as and/or includes a floating point auxillary buffer, an attribute buffer, a geometry buffer, and/or a super buffer. Fat framebuffers are flexible and allow a user to store a wide variety of different types of graphical data. A fat framebuffer can include, for example, vertex positions, normals, color, texture, normal maps, bump maps, and/or depth data. Fat framebuffers can be used as input in custom pixel and/or vertex shader programs that are run on graphics hardware (i.e. on the graphics card). In one embodiment, a fat framebuffer is used to capture vertex positions and normals. For example, in one embodiment, primitives are graphically rendered to a fat framebuffer, and pixel shading and/or vertex shading is performed using data from the fat framebuffer in the haptic rendering of a virtual environment. In one embodiment, a deferred shading process is used to render graphics primitives to a fat framebuffer.

It is possible to use graphics hardware to graphically render virtual objects to a texture map instead of a buffer. Thus, throughout the specification, where graphical data is described as being stored in or read from a buffer, the data may alternately be stored in or read from a texture map.

In one embodiment, determining the position of the haptic interface location using data from the first virtual camera includes performing an intersection test to determine an intersection point and intersection normal in screen space, and transforming the coordinates of the intersection point and intersection normal from screen space to object space. Alternatively, the graphical data can be used to determine the closest geometric feature, such as a point, line or plane, to the virtual proxy via a projection test. These geometric queries are important for haptic rendering of 1D, 2D, and/or 3D contacts and/or constraints.

In another aspect, a system is provided for haptically rendering a virtual object in a virtual environment. The system comprises a graphics thread that generates a visual display of a virtual environment, a collision thread that uses input from the graphics thread to determine if a user-directed virtual proxy collides with a surface within the virtual environment, and a servo thread that generates force to be applied to a user in real space though a haptic interface device according to input from the collision thread.

In one embodiment, the graphics thread refreshes the visual display at a rate within a range, for example, from about 5 Hz to about 150 Hz, or from about 30 Hz to about 60 Hz. Refresh rates above and below these levels are possible as well. In one embodiment, the collision thread performs a collision detection computation at a rate within a range, for example, from about 30 Hz to about 200 Hz, or from about 80 Hz to about 120 Hz. Computation rates above and below these levels are possible as well. In one embodiment, the servo thread refreshes the force to be applied through the haptic interface device at a rate within a range from about 1000 Hz to about 10,000 Hz. Force refresh rates above and below these levels are possible as well. In one embodiment, the servo thread includes a force shader.

In yet another aspect, an apparatus is provided for providing haptic feedback to a user of a 3D graphics application. The apparatus comprises a user-controlled haptic interface device adapted to provide a user input to a computer and to transmit force to a user. The apparatus also includes computer software that, when operating with the computer and the user input, is adapted to determine force transmitted to the user. The force transmitted to the user is determined by a process that comprises determining a haptic interface location in a 3D virtual environment corresponding to a location of the haptic interface device in real space and positioning a first virtual camera substantially at the haptic interface location. Graphical data is then accessed using the first virtual camera. A position of the haptic interface location in relation to a surface of a virtual object in the virtual environment is determined using the graphical data from the first virtual camera. Finally, an interaction force is determined, based at least in part on the position of the haptic interface location in relation to the surface of the virtual object.

There may be any number of cameras in a given scene. For example, each individual virtual object in a scene may have its own camera; thus, the number of cameras is unlimited. This allows a user to adapt the camera view to best suit individual objects, which allows for further optimization. For example, the camera position and view frustum for objects that are graphically rendered (and/or haptically rendered) using the depth buffer can be set differently than those rendered using the feedback buffer. In addition, there can be multiple haptic devices in a given scene. Each haptic device can have a different camera for each object, since the position and motion of the haptic devices will generally be different.

BRIEF DESCRIPTION OF DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 4A is a schematic diagram illustrating a system for haptically rendering a virtual environment using data in a graphics pipeline, the system including a graphics thread, a collision thread, and a servo thread, according to an illustrative embodiment of the invention.

FIG. 8B is/are used to haptically render the virtual object, according to an illustrative embodiment of the invention.

DETAILED DESCRIPTION OF THE INVENTION

Throughout the description, where an apparatus is described as having, including, or comprising specific components, or where systems, processes, and methods are described as having, including, or comprising specific steps, it is contemplated that, additionally, there are apparati of the present invention that consist essentially of, or consist of, the recited components, and that there are systems, processes, and methods of the present invention that consist essentially of, or consist of, the recited steps.

It should be understood that the order of steps or order for performing certain actions is immaterial so long as the invention remains operable. Moreover, two or more steps or actions may be conducted simultaneously.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired. As used herein, the term "3D" is interpreted to include 4D, 5D, and higher dimensions.

It is an object of the invention to leverage the processing power of modern 3D graphical rendering systems for use in the haptic rendering of a virtual environment containing, for example, one or more virtual objects. It is a further object of the invention to introduce a virtual camera in the virtual environment located at a haptic interface location, which can be moved by a user. The view volume of this "haptic camera" can be sized to exclude unnecessary regions of the virtual environment, and the graphical data can be used for haptically rendering one or more virtual objects as the user moves about the virtual environment.

Figure 1:
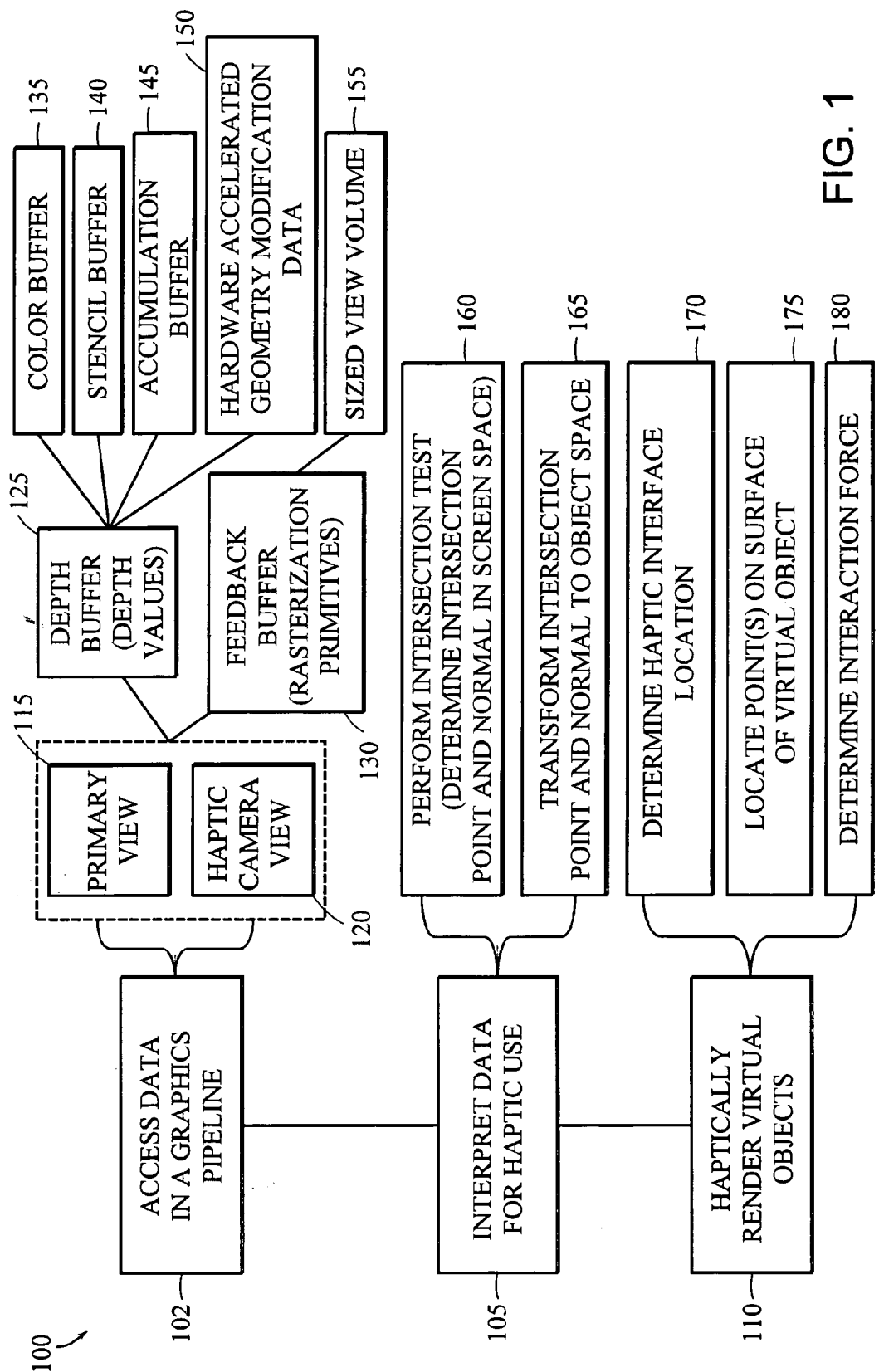
FIG. 1 is a block diagram featuring a method of haptically rendering one or more virtual objects in a virtual environment using data in a graphics pipeline, according to an illustrative embodiment of the invention.

FIG. 1 is a block diagram 100 featuring a method of haptically rendering one or more virtual objects in a virtual environment using data in a graphics pipeline of a 3D graphics application. The method shown in FIG. 1 includes three main steps—accessing data in a graphics pipeline of a 3D graphics application 102; interpreting data for use in haptic rendering 105; and haptically rendering one or more virtual objects in the virtual environment 110.

A graphics pipeline generally is a series of steps, or modules, that involve the processing of 3D computer graphics information for viewing on a 2D screen, while at the same time rendering an illusion of three dimensions for a user viewing the 2D screen. For example, a graphics pipeline may comprise a modeling transformation module, in which a virtual object is transformed from its own object space into a common coordinate space containing other objects, light sources, and/or one or more cameras. A graphics pipeline may also include a rejection module in which objects or primitives that cannot be seen are eliminated. Furthermore, a graphics pipeline may include an illumination module that colors objects based on the light sources in the virtual environment and the material properties of the objects. Other modules of the graphics pipeline may perform steps that include, for example, transformation of coordinates from world space to view space, clipping of the scene within a three dimensional volume (a viewing frustum), projection of primitives into two dimensions, scan-conversion of primitives into pixels (rasterization), and 2D image display.

Information about the virtual environment is produced in the graphics pipeline of a 3D graphics application to create a 2D display of the virtual environment as viewed from a given camera view. The camera view can be changed to view the same virtual environment from a myriad of vantage points. The invention capitalizes on this capability by haptically rendering the virtual environment using graphical data obtained from one or more virtual cameras. In one embodiment, the invention accesses data corresponding to either or both of a primary view 115 and a haptic camera view 120, where the primary view 115 is a view of the virtual environment from a fixed location, and the haptic camera view 120 is a view of the virtual environment from a moving location corresponding to a user-controlled haptic interface location. The haptic camera view 120 allows a user to reach behind an object to feel what is not immediately visible on the screen (the primary view 115).

Information about the geometry of the virtual environment can be accessed by making the appropriate function call to the graphics API. Data can be accessed from one or more data buffers—for example, a depth buffer 125, as shown in the block diagram of FIG. 1, and a feedback buffer 130 (or its equivalent). Use of this data for haptic rendering enables the reuse of the scene traversal and graphics API rendering state and functionality.

The depth buffer 125 is typically a two-dimensional image containing pixels whose intensities correspond to depth (or height) values associated with those pixels. The depth buffer is used during polygon rasterization to quickly determine if a fragment is occluded by a previously rendered polygon. The depth buffer is accessed by making the appropriate function call to the graphics API. This information is then interpreted in step 105 of the method of FIG. 1 for haptic use. Using depth buffer data provides several advantages. For example, depth buffer data is in a form whereby it can be used to quickly compute 3D line segment intersections and inside/outside tests. Furthermore, the speed at which these depth buffer computations can be performed is substantially invariant to the density of the polygons in the virtual environment. This is because the data in the depth buffer is scalar data organized in a 2D grid having known dimensions, the result of rasterization and occlusion processing.

Other data buffers in the graphics pipeline include a color buffer 135, a stencil buffer 140, and an accumulation buffer 145. The color buffer 135 can store data describing the color and lighting conditions of vertices. The accumulation buffer 145 can be used to accumulate precise intermediate rendering data. The stencil buffer 140 can be used to flag attributes for each pixel and perform logic operations as part of pixel fragment rendering. These buffers may be used, for example, to modify and/or map various haptic attributes—for example, friction, stiffness, and/or damping—to the pixel locations of the depth buffer. For example, color buffer data 135 may be used to encode surface normals for force shading. Stencil buffer data 140 can indicate whether or not to allow drawing for given pixels. Stencil buffer data 140 can also be incremented or decreased every time a pixel is touched, thereby counting the number of overlapping primitives for a pixel. The stencil contents can be used directly or indirectly for haptic rendering. For example, it can be used directly to flag pixels with attributes for enabling and/or disabling surface materials, such as areas of friction. It can also be used indirectly for haptics by graphically rendering geometry in a special way for haptic exploration, like depth peeling or geometry capping.

Encoding normals in the color buffer includes setting up the lighting of the virtual environment so that normals may be mapped into values in the color buffer, wherein each pixel contains four components <r,g,b,a>. A normal vector <x,y,z> can be stored, for example, in the <r,g,b> components by modifying the lighting equation to use only the diffuse term and by applying the lighting equation for six colored lights directed along the local axes of the object coordinate space. For example, the x direction light is colored red, the y direction light is colored green, and the z direction light is colored blue, so that the directional components of the pixels match their color components. Then the lighting equation is written as a summation of dot products scaled by the respective color of the light. This results in normal values which may be used, for example, for smooth force shading.

Data contained in the depth buffer 125, feedback buffer 130, color buffer 135, stencil buffer 140, and/or accumulation buffer 145, among other data buffers, may be altered by hardware such as a graphics card. A graphics card can perform some of the graphical data processing required to produce 2D screen views of 3D objects, thereby saving CPU resources. Data produced from such hardware-accelerated geometry modifications 150 is used in certain embodiments of the invention. Modern graphics cards have the ability to execute custom fragment and vertex shading programs, enabling a programmable graphics pipeline. It is possible to leverage the results of such geometry modifications for purposes of haptic rendering. For example, view-dependent adaptive subdivision and view-dependent tessellation be used to produce smoother-feeling surfaces. Displacement mapping can result in the haptic rendering of surface details such as ripples, crevices, and bumps, which are generated onboard the graphics card.

In one embodiment, an "adaptive viewport" is used to optimize depth buffer haptic rendering, wherein the bounds of the viewport are read-back from the graphics card. For example, the entire viewport may not be needed; only the portion of the depth buffer that contains geometry within the immediate vicinity of the haptic interface location may be needed. In an adaptive viewport approach, the bounds of the viewport that are to be read-back from the graphics card are determined by projecting the haptic interface location onto the near plane and by determining a size based on a workspace to screen scale factor. In this way, it is possible to ensure that enough depth buffer information is obtained to contain a radius of workspace motion mapped to screen space.

Certain 3D graphics API's, for example, OpenGL, offer a mode of operation called feedback mode, which provides access to the feedback buffer 130 (FIG. 1) containing information used by the rasterizer for scan-filling primitives to the viewport. In one embodiment, the method of FIG. 1 includes the step of accessing the feedback buffer 130 and interpreting the data from the feedback buffer for haptic use. The feedback buffer 130 provides access to the primitives within a view volume. The view volume may be sized to include only portions of the virtual environment of haptic interest. Therefore, haptic rendering of primitives outside the view volume need not take place, and valuable processing resources are saved.

It is possible to simulate non-uniform surface properties using data in the feedback buffer 130 via groups of primitives, per vertex properties, and/or via texture mapping. In certain embodiments, the feedback buffer provides data that is more precise than depth buffer data, since primitives in the feedback buffer have only undergone a linear transformation, whereas the depth buffer represents rasterized primitives, thereby possibly introducing aliasing errors.

Step 105 of the method of FIG. 1 is directed to interpreting the graphical rendering data accessed in step 102 for haptic use. In one embodiment, step 105 involves performing an intersection test 160 to determine an intersection point and a normal in screen space, and transforming the intersection point coordinates and normal coordinates to object space 165. The point and normal together define a local plane tangent to the surface of the virtual object. In one embodiment in which a depth values from a depth buffer 125 are used, the intersection test of step 160 is essentially a pixel raycast along a line segment, where the depth buffer is treated as a height map. A line segment that is defined in object space is transformed into screen space and tested against the height map to find an intersection. An intersection is found by searching along the line segment (in screen space) and comparing depth values to locations along the line segment. Once a crossing has been determined, a more precise intersection can be determined by forming triangles from the local depth values. This provides an intersection point and an intersection normal, where the intersection normal is normal to a surface corresponding to the screen space height map at the intersection point. In step 165, the intersection point and normal are transformed back into object space to be used as part of a haptic rendering method. Example haptic rendering methods are described in co-owned U.S. Pat. No. 6,191,796 to Tarr, U.S. Pat. No. 6,421,048 to Shih et al., U.S. Pat. No. 6,552,722 to Shih et al., U.S. Pat. No. 6,417,638 to Rodomista et al., and U.S. Pat. No. 6,671,651 to Goodwin et al., the disclosures of which are incorporated by reference herein in their entirety.

In one embodiment in which screen space rasterization primitives 130 are accessed in step 102 in the method of FIG.

1, the intersection test of step 160 also involves transforming a line segment from object space to screen space and performing a line intersection test against candidate primitives. An intersection point and intersection normal are found along the line segment and are transformed back into object space for haptic rendering.

Step 110 of the method of FIG. 1 is directed to haptically rendering one or more virtual objects in the virtual environment using the interpreted data from step 105. In one embodiment, the haptic rendering step includes determining a haptic interface location in the virtual environment corresponding to a user's position in real space (i.e. via a user's manipulation of a haptic interface device) 170, locating one or more points on the surface of one or more virtual objects in the virtual environment (i.e. the surface point nearest the haptic interface location) 175, and determining an interaction force 180 according to the relationship between the haptic interface location and the surface location(s). Thus, step 110 may involve determining when a collision occurs between a haptic interface location (i.e. a virtual tool location) and a virtual object. In one embodiment, a collision occurs when the haptic interface location crosses through the surface of a virtual object. The interaction force that is determined in step 180 may be delivered to the user through the haptic interface device. The determination and delivery of a feedback force to a haptic interface device is described, for example, in co-owned U.S. Pat. Nos. 6,191,796, 6,421,048, 6,552,722, 6,417,638, and 6,671,651, the disclosures of which are incorporated by reference herein in their entirety.

Figure 2:
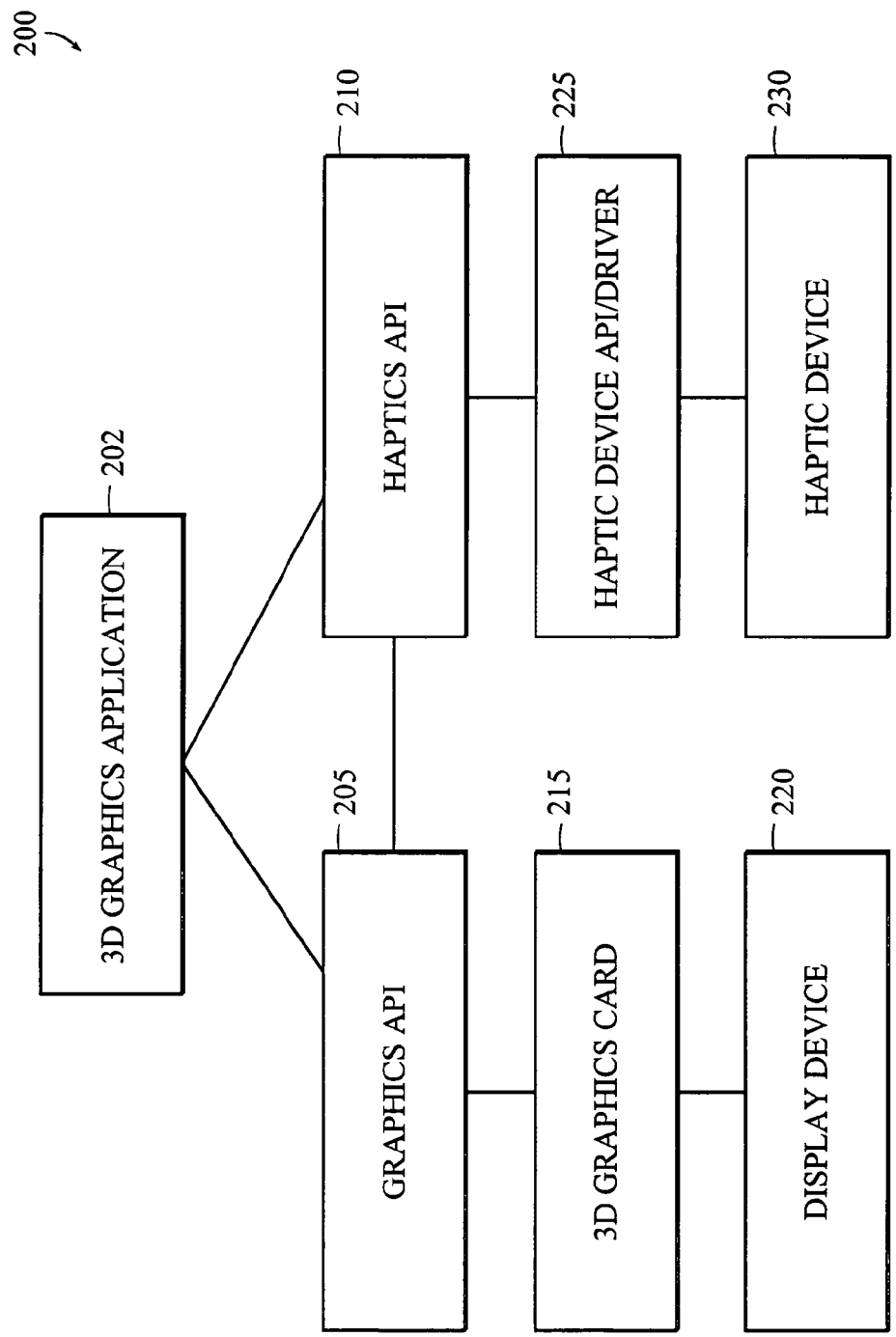
FIG. 2 is a schematic diagram illustrating a system for haptically rendering a virtual environment using data in a graphics pipeline, the diagram showing an interaction between a 3D graphics application, a graphics application programming interface (API), a 3D graphics card, and a haptics API, according to an illustrative embodiment of the invention.

FIG. 2 is a schematic diagram 200 illustrating, in a simplified way, a system for haptically rendering a virtual environment using data in a graphics pipeline. The diagram shows an interaction between a 3D graphics application 202, a graphics application programming interface (API) 205, a 3D graphics card 215, and a haptics API 210. Certain methods of the invention may be embodied in, and may be performed using, the haptics API 210, the graphics API 205, the 3D graphics application 202, and/or combinations thereof.

A 3D graphics application 202 may be written or adapted to enable the user of the application to see a visual representation of a 3D virtual environment on a two-dimensional screen while "feeling" objects in the 3D virtual environment using a peripheral device, such as a haptic interface device. The graphics application makes function calls referencing function libraries in a graphics API 205. The graphics API communicates with the 3D graphics card 215 in order to graphically render a virtual environment. A representation of at least a portion of the virtual environment is displayed on a display device 220.

The system 200 of FIG. 2 permits a programmer to write function calls in the 3D graphics application 202 to call a haptics API 210 for rendering a haptic representation of at least a portion of the virtual environment. The haptics API 210 accesses graphical rendering data from the 3D graphics pipeline by making function calls to the graphics API. The graphical data may include a data buffer, such as a depth buffer or feedback buffer. The system 200 interprets the graphical data to haptically render at least a portion of the virtual environment. The haptic rendering process may include determining a force feedback to deliver to the user via a haptic interface device 230. A haptic device API and a haptic device driver 225 are used to determine and/or deliver the force feedback to the user via the haptic interface device 230.

The haptics API 210 performs high-level haptics scene rendering, and the haptic device API 225 performs low-level force rendering. For example, the high-level haptics API 210 provides haptic rendering of shapes and constraints and the low-level haptic device API 225 queries device state, sends forces, and/or performs thread control, calibration, and error handling. The 3D graphics application may make direct calls to either or both the haptics API 210 and the haptic device API 225.

Figure 3:
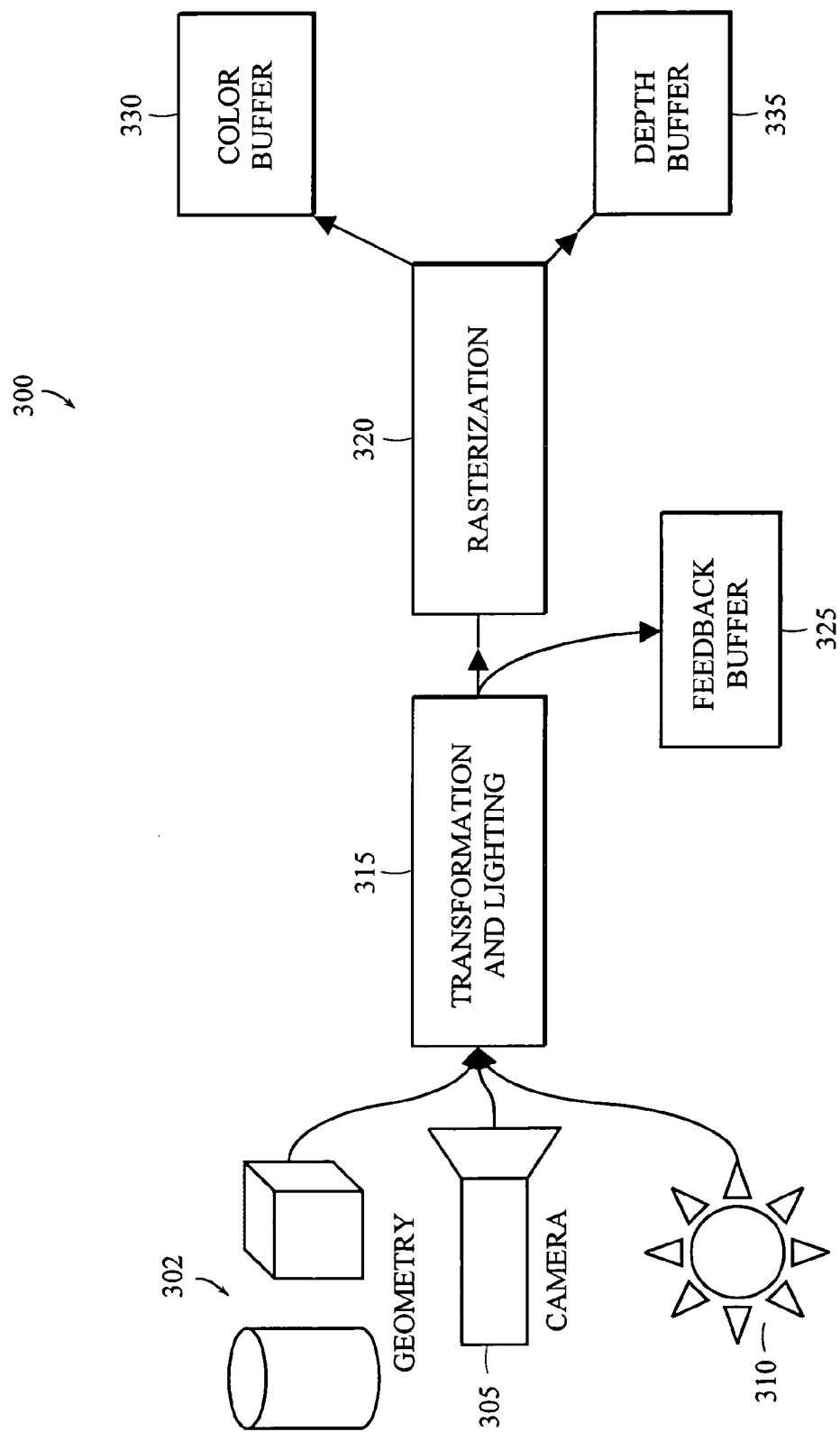
FIG. 3 is a schematic diagram illustrating a graphics pipeline of a 3D graphics application, according to an illustrative embodiment of the invention.

FIG. 3 illustrates a 3D graphics pipeline 300, in which graphical data describing one or more 3D objects in a virtual environment is used to create a 2D representation for display on a two-dimensional screen. Graphical data corresponding to the scene geometry 302, a camera view 305, and lighting 310, undergoes a series of transformations 315. The resultant primitives data then undergoes a rasterization process 320, producing 2D graphical data that may be stored in 2D buffers, for example, a color buffer 330 and a depth buffer 335. The primitives data as it exists prior to rasterization can be accessed, for example, via a feedback buffer 325. Methods of the invention use the graphical data in the 3D graphics pipeline 300, for example, the feedback buffer 325, the depth buffer 335, and the color buffer 330, for haptically rendering the virtual environment, as described in more detail herein.

FIG. 4A is a simplified schematic diagram illustrating components of a system 400 for haptically rendering a virtual environment using data in a graphics pipeline. The system 400 comprises computational elements 402 including a graphics thread 405, a collision thread 410, and a servo thread 415, as well as a display device 420 and a haptic interface device 425. The graphics thread 405 is adapted to generate a visual display of a virtual environment to be displayed on the display device 420. The collision thread 410 determines if a user-directed virtual proxy (i.e. a haptic interface location) collides with a surface within the virtual environment, based on input from the graphics thread 405. The servo thread 415 determines (and may generate) a force to be applied to a user in real space via the haptic interface device 425 according to input from the collision thread 410.

Figure 4B:
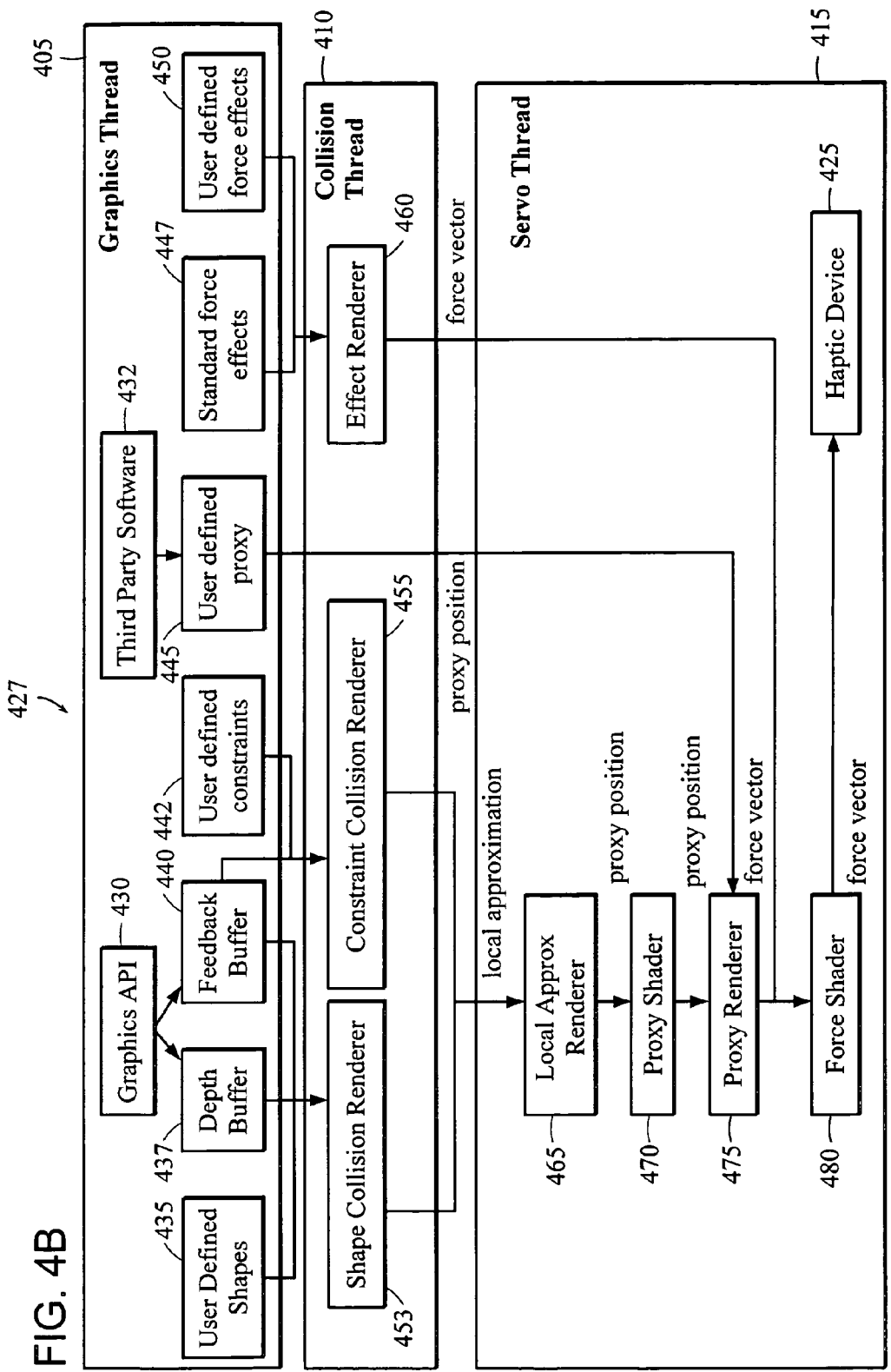
FIG. 4B is a schematic diagram illustrating the system of FIG. 4A in further detail, according to an illustrative embodiment of the invention.

FIG. 4B is a schematic diagram 427 illustrating the system of FIG. 4A in further detail. The graphics thread 405 is adapted to generate a visual display of a virtual environment. API commands 430 are used to access graphical rendering data, including the depth buffer 437 and feedback buffer 440. In one embodiment, this data is used for both haptic and graphical rendering. Additionally, the user (and/or the 3D graphics software programmer) may define custom shapes 435 and custom constraints 442 independent of the graphics API 430. Custom shapes 435 include, for example, NURBS shapes, SubDs, voxel-shapes, and the like. Custom constraints include, for example, constraint to surfaces, lines, curves, arcs, and the like. Standard force effects 447 and user-defined force effects 450 may also be assigned in the graphics thread 405. Additional software, for example, third-party software, may be integrated with the graphics thread 405, for example, in a user-defined proxy module 445. In certain embodiments, the graphics thread 405 refreshes the display device 420 at a rate, for example, within the range from about 10 Hz to about 150 Hz, within the range from about 20 Hz to about 110 Hz, or, preferably, within the range from about 30 Hz to about 60 Hz. Rates above and below these levels are possible as well.

The collision thread 410 of FIG. 4B is adapted to determine whether a user-directed virtual proxy collides with a surface within the virtual environment. In one embodiment, the collision thread comprises three modules, including a shape collision renderer 453, a constraint collision renderer 455, and an effect renderer 460. The shape collision renderer 453 is adapted to calculate the shapes in the virtual environment and to identify their collision with each other or with proxies.

The shape collision renderer 453 may use data from the depth buffer 437, the feedback buffer 400, and user defined shape data 435. Similarly, the constraint collision renderer 455 may use data from the depth buffer 437, feedback buffer 440, and from user-defined constraints 442. The effect renderer 460 may use data from the standard force effects module 447 and from the user-defined force effects module 450. One of the functions of the effect renderer 460 is to compose the force shader 480 in the servo thread 415, so that the force shader 480 is able to simulate force effects at the typically higher servo loop rate. For example, the effect renderer 460 can start, stop, and manage parameters for the force shader 480. In certain embodiments, the collision thread 410 may perform a collision detection computation at a rate within the range from about 10 Hz to about 200 Hz, from about 80 Hz to about 120 Hz, or, preferably, at about 100 Hz. Rates above and below these levels are possible as well.

Next, the servo thread 415 generates a force to be applied to a user in real space via the haptic interface device 425 according to input from the collision thread 410. The force is calculated by using data from the shape collision renderer 453 and from the constraint collision renderer 455. Data from these two renderers are used to calculate a local approximation, which is transmitted to the local approximation renderer 465. The local approximation renderer 465 resolves a position/orientation transform for the proxy, which is used for producing a contact or constraint force. The proxy can be represented by the position of a single point, but can alternatively be chosen as having any arbitrary geometry. The local approximation transmitted to the local approximation renderer 465 is a collection of geometry determined in the collision thread generally at a lower processing rate than the servo thread. This local approximation geometry may be used for several updates of the servo loop thread. The local approximation geometry generally serves as a more efficient representation for collision detection and resolution than the source geometry processed by the collision thread. The proxy position information is transmitted to a proxy shader 470 and then to a proxy renderer 475, along with the user-defined proxy information 445 from the graphics thread.

In one embodiment, a force shader 480 enables modification of a calculated force vector prior to transmitting the force vector to the haptic interface device 425. For example, rendered proxy data from the proxy renderer 475, along with force vector data from the effect renderer 460, are used by the force shader 480 to calculate a modified force vector, which is then transmitted to the haptic interface device 425. The force shader 480 is thus able to modify the direction and magnitude of the force vector as determined by preceding modules such as the proxy renderer 475 and the effect renderer 460. The force shader 480 may also have access to data from other modules in the schematic diagram 427 of FIG. 4B, such as the local approximation renderer 465 and the proxy shader 470. The force shader 480 may be used for simulating arbitrary force effects. Examples of such force effects include inertia, viscosity, friction, attraction, repulsion, and buzzing.

The force shader 480 may also be used for modifying the feel of a contacted surface. For example, the force shader 480 may be used to simulate a smooth surface by modifying the force vector direction so that it is smoothly varying while contacting discontinuous surface features. As such, force discontinuities apparent when transitioning from one polygonal face to another may be minimized by the force shader 480 by aligning the force vector to an interpolated normal based on adjacent faces. The force shader 480 may also be used for general conditioning or filtering of the computed force vector, such as clamping the magnitude of the force vector or increasing the magnitude of the force vector over time. In one embodiment, the force shader is used to reduce the magnitude and directional discontinuities over time, which can result from instabilities in the control system or mechanical instabilities in the haptic interface device 425.

The servo thread 415 may refresh the force to be applied through the haptic interface device 425 at a rate within the range from about 500 Hz to about 15,000 Hz, from about 1000 Hz to about 10,000 Hz, or from about 2000 Hz to about 6000 Hz. Rates above and below these levels are possible as well.

In one embodiment, a scheduler interface manages the high frequency for sending forces and retrieving state information from the haptic interface device 425. The scheduler allows the 3D graphics application to communicate effectively with the servo thread in a thread-safe manner and may add and delete operations to be performed in the servo thread. Furthermore, in one embodiment, a calibration interface allows the system to maintain an accurate estimate of the physical position of the haptic interface device 425. Calibration procedures may be manual and/or automatic.

Figure 5:
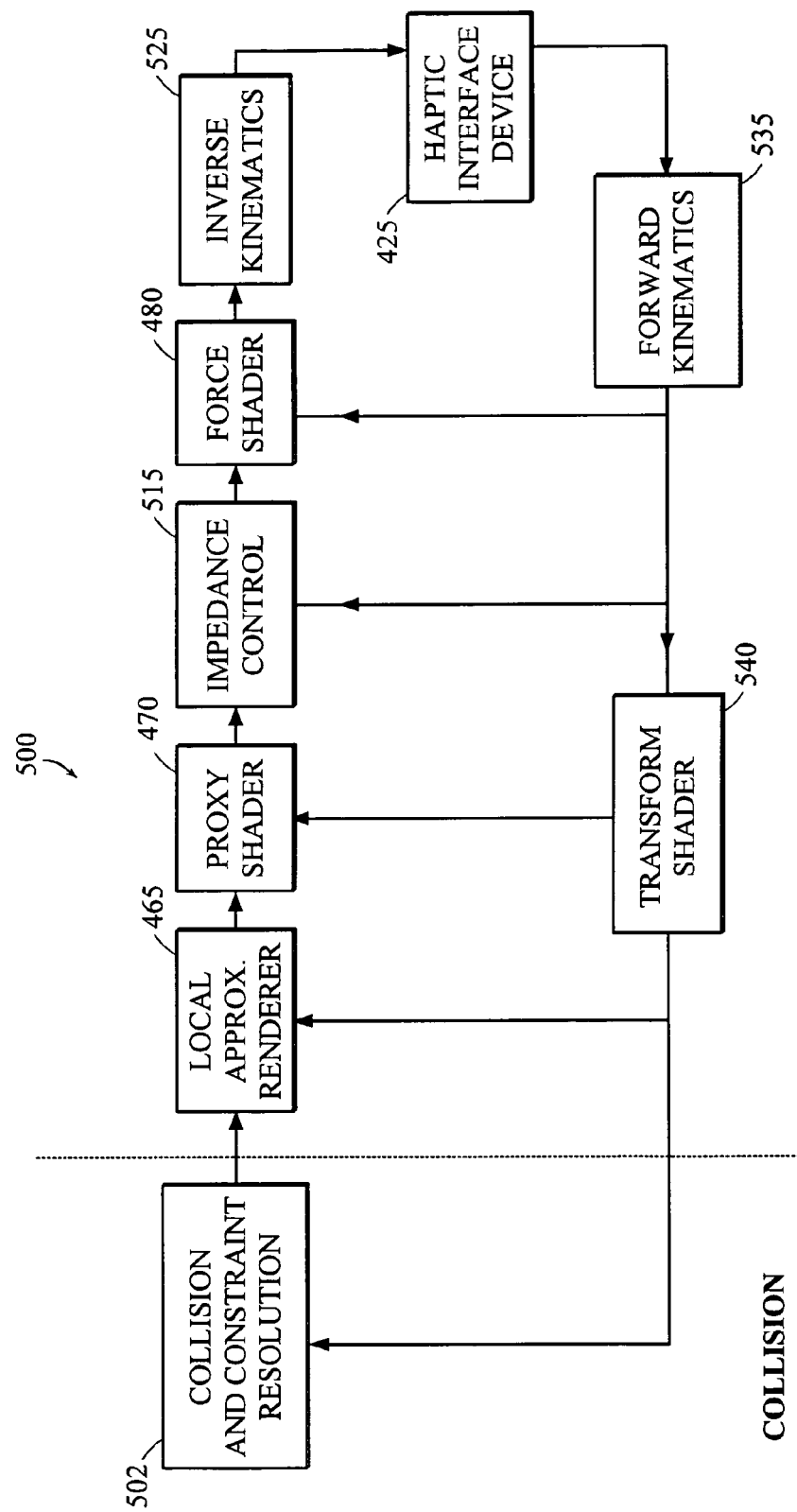
FIG. 5 is a schematic diagram illustrating a servo thread of a haptics rendering pipeline, according to an illustrative embodiment of the invention.

FIG. 5 is a schematic diagram 500 illustrating a servo thread of an illustrative haptics rendering pipeline. Collision and constraint resolution data 502 from the virtual environment is transmitted from the collision thread to the local approximation renderer 465. The local approximation renderer 465 calculates a proxy position, which is then transmitted to a proxy shader 470 and then to impedance control 515, producing a force. The force is modified by the force shader 480, then transmitted to the haptic interface device 425 following application of inverse kinematics 525. Forward kinematics 535 from the haptic interface device 535 is fed back to the force shader 480 and the impedance controller 515, and is transmitted to a transform shader 540, which provides feedback to the local approximation renderer 465 and proxy shader 470.

Figure 6:
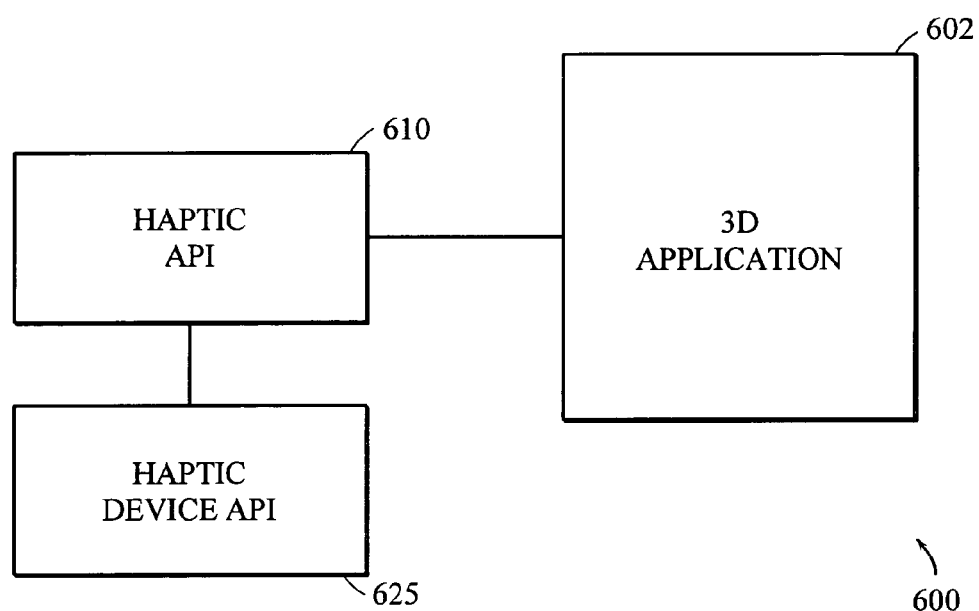
FIG. 6 is a schematic diagram illustrating a system for haptically rendering a virtual environment using data in a graphics pipeline, the diagram showing how third-party 3D graphics application software is integrated with the system, according to an illustrative embodiment of the invention.

FIG. 6 is a schematic diagram 600 illustrating a system for haptically rendering a virtual environment using data in a graphics pipeline of a 3D graphics application. The diagram 600 shows how third-party 3D graphics application software is integrated with the system. The diagram 600 illustrates the interaction between the 3D graphics application 602, a haptics API 610, and a haptic device API 625. The graphics application 600 can make a function call to the haptics API 610. The haptics API 610 then accesses data from the 3D graphics pipeline. The haptics API 610 also transmits data to the haptic device API 625, which performs low-level force rendering.

Figure 7:
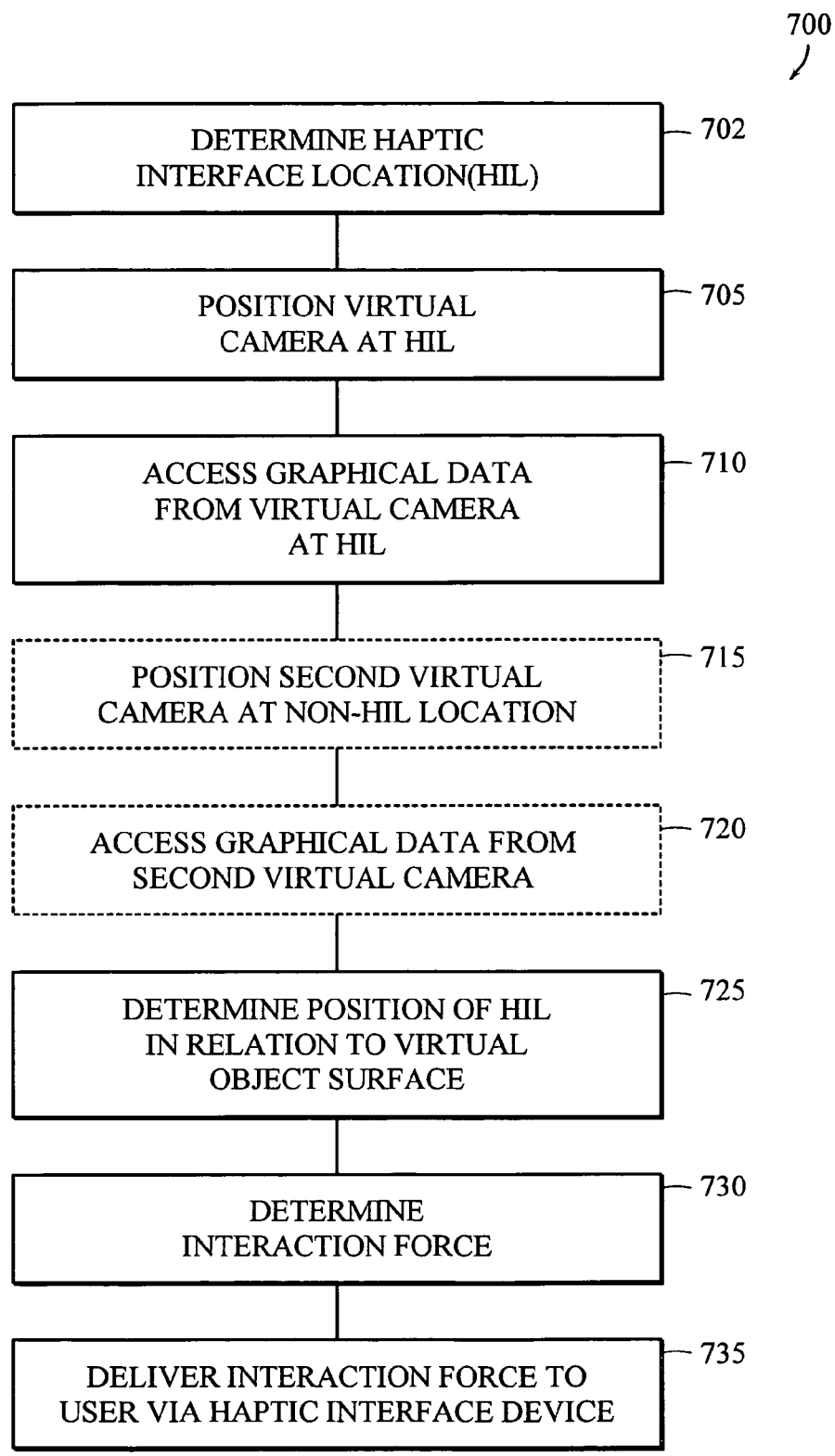
FIG. 7 is a block diagram featuring a method of delivering interaction force to a user via a haptic interface device, the force based at least in part on graphical data from a virtual camera located at a haptic interface location, according to an illustrative embodiment of the invention.

FIG. 7 is a block diagram 700 featuring a method of delivering interaction force to a user via a haptic interface device, where the force is based at least in part on graphical data from a virtual camera located at a haptic interface location. The method includes determining a haptic interface location in a 3D virtual environment corresponding to the position of a haptic interface device in real space 702. The method further includes positioning a first virtual camera at the haptic interface location 705. The first virtual camera is usually implemented using matrix transformations that map 3D virtual objects in coordinate space into a 2D representation, so that the virtual environment, populated with the virtual objects, appears as if viewed by a camera. By modifying these transformations, the virtual camera view can be changed to view the same object from any of a plurality of vantage points. These transformations include a modeling transformation, a viewing transformation, a projection transformation, and a display device transformation. These are discussed in further detail with respect to FIG. 9 herein below. Furthermore, the position of the first camera is updated as the haptic interface location changes, according to the manipulation of the haptic interface device by the user.

The method of FIG. 7 next includes the step of accessing graphical data corresponding to the virtual environment as viewed from the first virtual camera at the haptic interface location 710. The accessed data is then used in the graphical rendering of the virtual environment, for example, according to methods described herein.

The method of FIG. 7 may optionally include the step of positioning a second virtual camera at a location other than the haptic interface location 715. The method would then comprise the step of accessing graphical data from the second virtual camera 720. The accessed data may be used for graphical rendering, haptic rendering, or both. In one embodiment, the second virtual camera is used for graphical rendering, while the first virtual camera is used for haptic rendering. The second camera may move, or it may be static. In one embodiment, the second virtual camera is fixed while the first virtual camera is capable of moving. The second virtual camera operates using matrix transformations as described with respect to step 705. The second virtual camera has associated with it a look direction and an eye position, independent of the look direction and eye position of the first virtual camera.

Figure 8A:
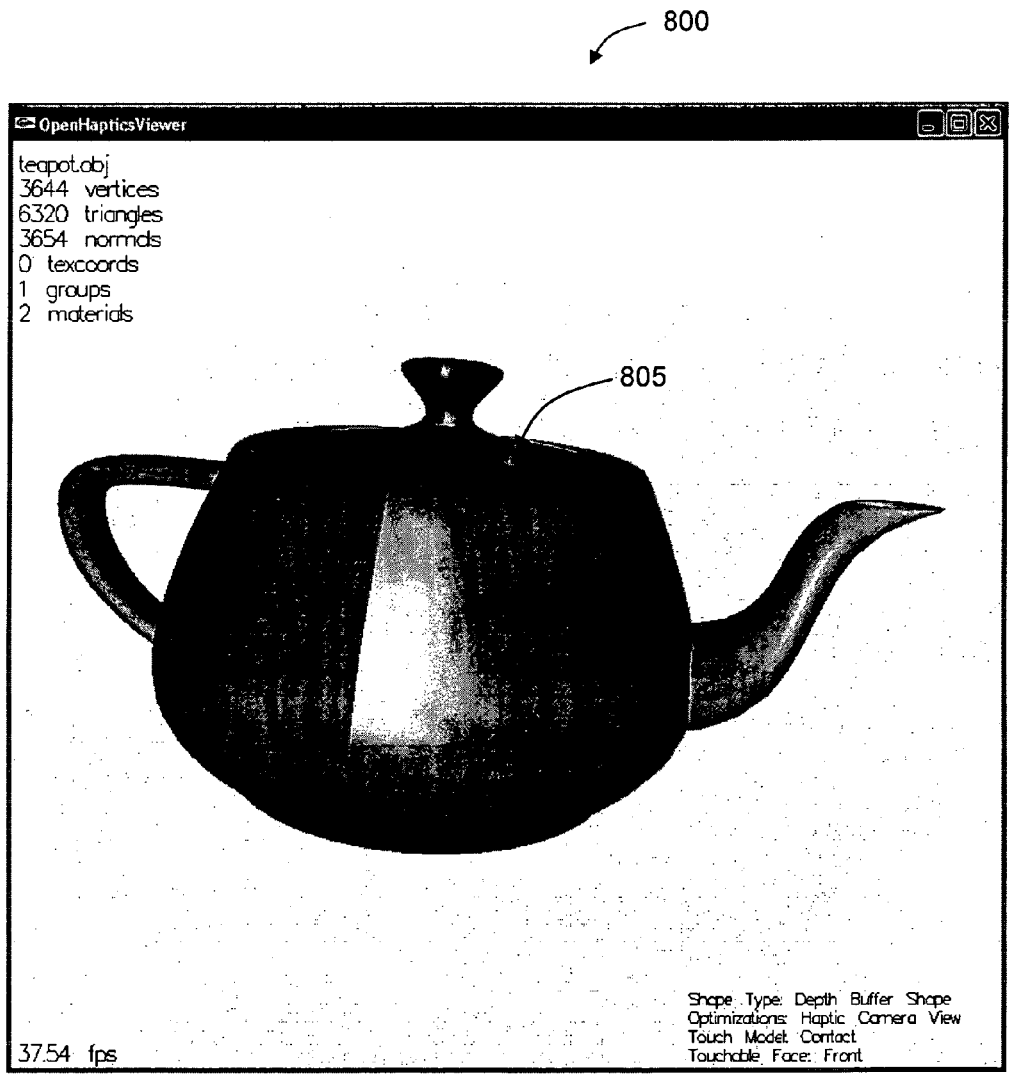
FIG. 8A is a screenshot of a virtual object in a virtual environment as imaged from a fixed camera view, the screenshot indicating a haptic interface location, or proxy position, representing the position of a user in the virtual environment, according to an illustrative embodiment of the invention.
Figure 8B:
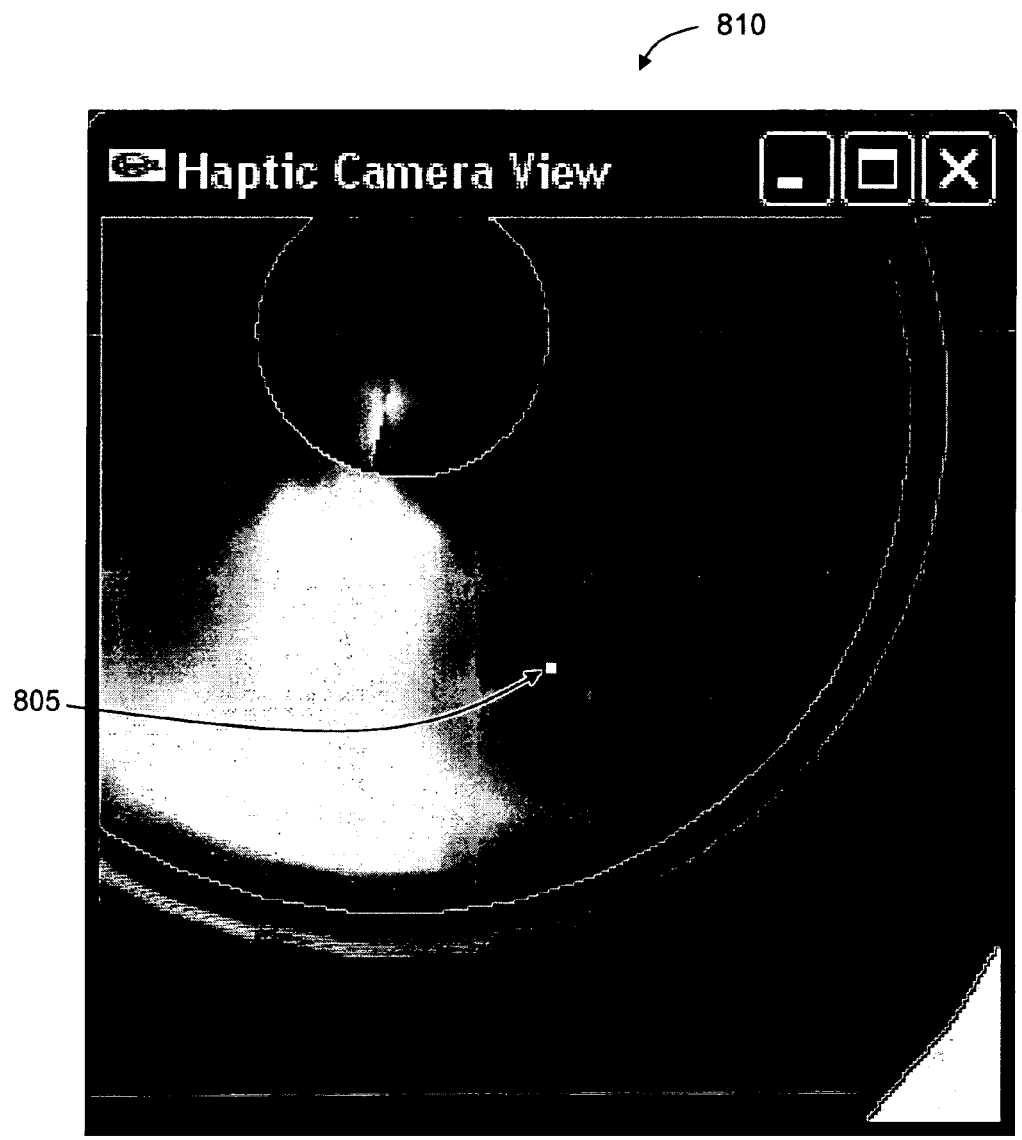
FIG. 8B is a screenshot of the virtual object of FIG. 8A as imaged from a moving camera view located at the haptic interface location shown in FIG. 8A, where graphical data from the images of either or both of FIG. 8A

FIG. 8A is a screenshot 800 of a virtual object (a teapot) in a virtual environment as imaged from a fixed camera view (i.e. the second camera view, as described with respect to FIG. 7). The screenshot 800 shows a haptic interface location 805, representing the position of a user in the virtual environment. A "haptic camera" (first virtual camera) is located at the haptic interface location, which moves as a user manipulates a haptic interface device in real space. FIG. 8B is a screenshot 810 of the virtual object of FIG. 8A as imaged from the moving haptic camera. As can be seen from the screenshot 810, additional detail is viewable from this vantage point. It is possible to haptically render the virtual object using the graphical data from the haptic camera. Efficiency is improved by limiting the information that is haptically rendered to only those parts of the virtual environment that can be "touched" by the user at any given time. Furthermore, geometry that is not visible from the second camera view (i.e. dedicated to providing a graphical display of the virtual environment) can be "felt" using graphical data from the haptic camera view. The user can feel behind the displayed teapot.

The view volume of the haptic camera may be optimized so as to view only areas of the virtual environment the user will want to touch or will be able to touch at any given time. For example, the view volume of the first virtual camera, dedicated to haptic rendering, may be limited to objects within the vicinity and trajectory of the haptic interface. As a result, haptic rendering will only need to be performed for this limited view volume, and not for all the geometry that is viewed from the vantage point of a graphics-dedicated second virtual camera. The method thereby increases the efficiency of the haptic rendering process.

Additionally, the method of FIG. 7 comprises determining a position of the haptic interface location in relation to a surface of a virtual object in the virtual environment by using graphical data from either or both of the first virtual camera and the second virtual camera 725. The method also includes determining an interaction force based at least in part on the position of the haptic interface location in relation to the surface of the virtual object 730. Finally, an interaction force is delivered to a user through the haptic interface device 735. The determination and delivery of an interaction force is described, for example, in U.S. Pat. Nos. 6,191,796, 6,421, 048, 6,552,722, 6,417,638, and 6,671,651, the disclosures of which are incorporated by reference herein in their entirety.

Figure 9:
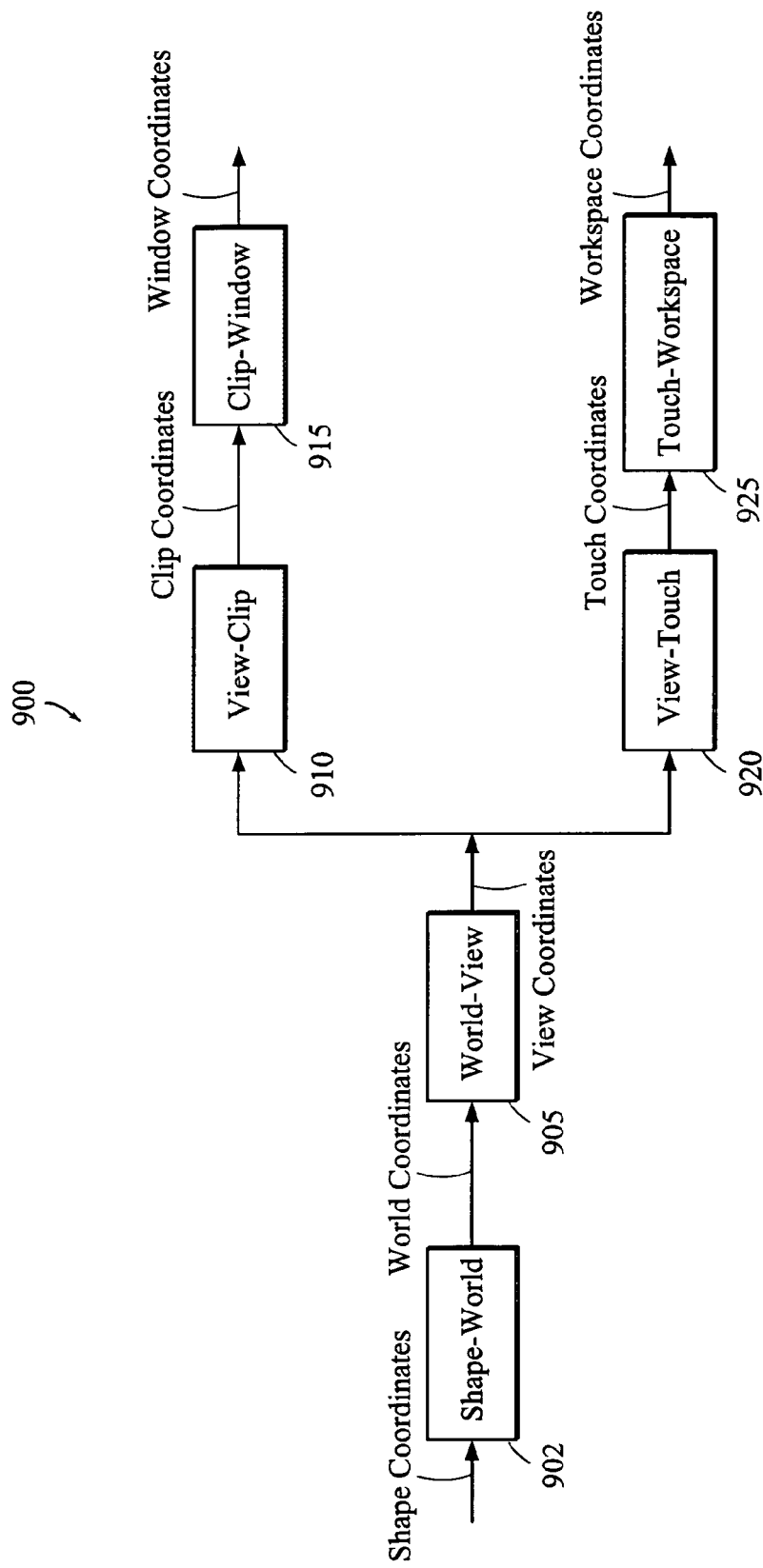
FIG. 9 is a block diagram featuring a 3D transformation pipeline for displaying 3D model coordinates on a 2D display device and for haptic rendering via a haptic interface device, according to an illustrative embodiment of the invention.

FIG. 9 is a schematic diagram 900 illustrating a 3D transformation pipeline. 3D graphics applications generally perform a series of transformations in order to display 3D model coordinates on a 2D display device. These transformations include a shape-world transformation 902, a world-view transformation 905, a view-clip transformation 910, and a clip-window transformation 915. Additional transformations that are used to haptically render a virtual environment via a haptic interface device include a view-touch transformation 920 and a touch-workspace transformation 925. The transformations in FIG. 9 can be repurposed for rendering a scene from a virtual haptic camera viewpoint, thereby affording improved acquisition and utilization of graphics pipeline data.

The shape-world transformation 902 of the pipeline of FIG. 9 transforms geometry describing a virtual object from its local coordinate space, or shape coordinates, into world coordinates, i.e., the main reference coordinate space for the 3D virtual environment. All objects in the virtual environment have a relationship to world coordinates, including cameras.

Figure 10:
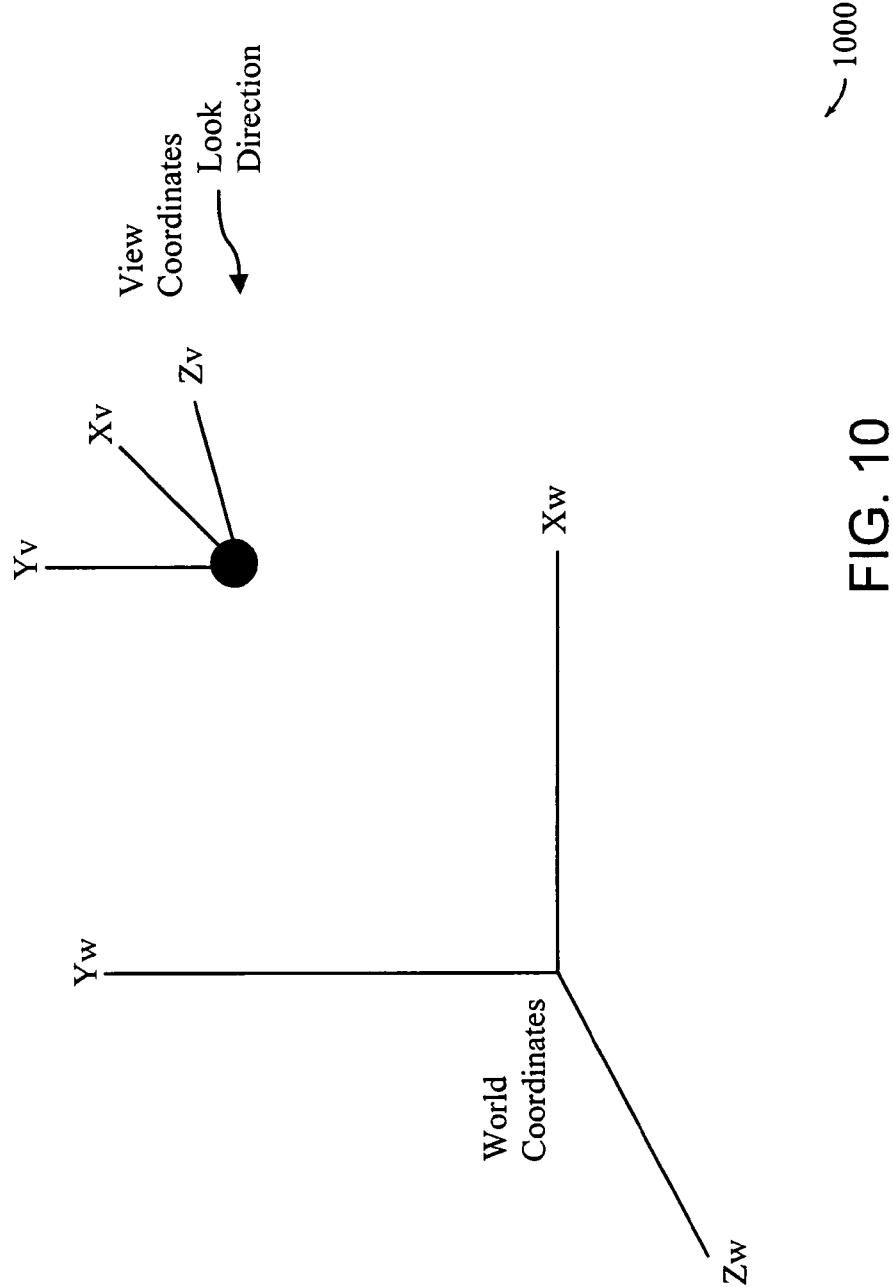
FIG. 10 is a schematic diagram illustrating the specification of a viewing transformation for a haptic camera view, according to an illustrative embodiment of the invention.

The world-view transformation 905 of the pipeline of FIG. 9 maps world coordinates to view coordinates, the local coordinates of the virtual camera. FIG. 10 illustrates the relation of view coordinates ($X_V, Y_V, Z_V$), with an associated look direction and camera eye position, to world coordinates ($X_W, Y_W, Z_W$). The look direction of FIG. 10 is preferably mapped to the z-axis of the world-view transform. The world-view transformation can be customized for translating and rotating the virtual camera so that it can view the scene as if attached to the position of the haptic device's virtual proxy.

Furthermore, where the virtual camera is a haptic camera as described above, the camera eye position of the world-view transformation is sampled from the virtual proxy position. In order to avoid undesirable jitter, the camera eye position is preferably only updated when the virtual proxy moves beyond a threshold distance from the current eye position. In one embodiment, for example, the threshold distance is 2 mm.

Figure 11:
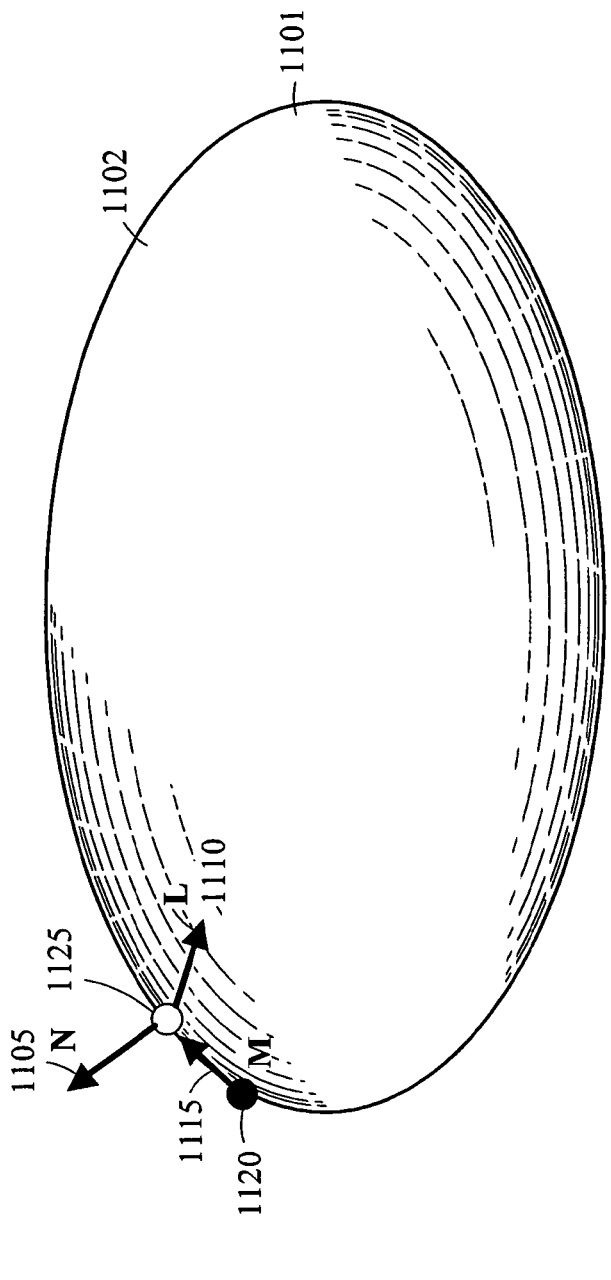
FIG. 11 is a schematic diagram illustrating the specification of a look direction for use in determining a viewing transformation for a haptic camera view when the position of a haptic interface location is constrained on the surface of a virtual object, according to an illustrative embodiment of the invention.

The look direction of the world-view transformation is determined by the motion of the proxy and optionally by the contact normal, for example, if the proxy is in contact with a virtual object in the virtual environment. When in contact with a virtual object, the proxy's position can be constrained to remain on the surface of the contacted virtual object. FIG. 11 illustrates the look direction 1110 when the virtual proxy is in contact with a virtual object 1101. Additionally, the camera eye position is updated as soon as the proxy has moved beyond a threshold distance. This defines the motion vector 1120 of the proxy. When moving in free space, the look direction is the normalized motion vector 1120. However, when in contact with a virtual object 1101, the look direction is a linear combination of the normalized motion vector 1120 and the contact normal 1105, as illustrated in FIG. 11. For example, where the haptic interface location (proxy position) is on the surface of the virtual object, as shown in FIGS. 8A and 8B, the look direction may be computed as a linear combination of the normalized motion vector and the contact normal. Thus, the haptic camera angle tilts to show more of what lies ahead, along the direction of motion.

The world-view transformation 905 of FIG. 9 can be computed by forming a composite rotation-translation matrix that transforms coordinates from world coordinates into view coordinates, mapping the look direction to an-axis (preferably the z-axis), and mapping the camera eye position to the origin. An up vector, such as the y-axis, may be selected to keep the view consistently oriented.

Another of the transformations in the 3D transformation pipeline of FIG. 9 is the view-clip transformation 910, also known as the projection transform. The view-clip transformation 910 enables manipulations of the shape and size of the view volume. The view volume determines which geometry is lit and rasterized for display on the 2D display device. As a result, geometry that lies outside the view volume is usually excluded from the remainder of the graphics pipeline.

When data from a virtual haptic camera is used for haptic rendering, the view volume may be sized so as to include only objects that are likely to be touched. In one embodiment, the size of the view volume is specified as a radius of motion in workspace coordinates of the haptic device which is transformed into view coordinates when composing the view-clip matrix. An orthographic view volume mapping centered around the origin is used with extents determined by the motion radius. By limiting the size of the view volume via the view-clip transformation 910, it is possible to localize the geometry that is received by the graphic pipeline when haptically rendering the scene, thereby optimizing the haptic rendering process.

Another of the transformations in the 3D transformation pipeline of FIG. 9 is the clip-window transformation 915, which converts clip coordinates into the physical coordinates of the display device so that an object in clip coordinates may be displayed on the display device. The clip-window transformation 915 is specified by a 2D pixel offset and a width and height in pixels. By using the clip-window transformation 915, it is possible to limit the amount of pixels used for rasterizing the geometry in the graphics pipeline. For optimal performance, it is not necessary to rasterize the localized contents of the view volume using the entire pixel buffer dimensions. There may be a tradeoff between performance and sampling error. For example, if the pixel buffer is too big, it will require more memory and copying time. However, if the pixel buffer is too small, it is possible that too many details will be lost for adequately realistic haptic rendering. The size of a display device buffer may be determined in consideration of the aforementioned tradeoff. In one embodiment, a width and height of 256 by 256 pixels for the display device buffer provides a sufficient compromise. Optimization of these dimensions is possible by considering the allowable time for pixel buffer read-back from the graphics card and the size of the smallest geometric feature in pixel coordinates.

The view-touch transformation 920 maps an object from view-coordinates into the touch coordinate space. The view-touch transformation 920 is convenient for altering the alignment or offset of touch interactions with respect to the view. As a default, this transformation may be left as identity so that the position and alignment of touch interactions are consistent with the view position and direction. However, the view-touch transformation 920 may be optionally modified to accommodate touch interactions with the scene in which the haptic device and display device are meant to be independent, for example, during use of a head-mounted display.

The touch-workspace transformation 925 maps an object in touch-coordinates into the local coordinate space of the haptic interface device. The haptic workspace is the physical space reachable by the haptic device. For example, the PHANTOM® Omni™ device, manufactured by SensAble Technologies, Inc., of Woburn, Mass., has a physical workspace of dimensions 160×120×70 mm.

The shape-world transformation 900, the world-view transformation 905, the view-clip transformation 910, the clip-window transformation 915, the view-touch transformation 920, and/or the touch-workspace transformation 925 may be structured for viewing a scene of a virtual environment from any of one or more virtual cameras. For example, these transformations may be structured for viewing a scene from a first virtual camera dedicated to haptic rendering, as well as a second virtual camera dedicated to graphical rendering. The processing capability of the graphics pipeline is leveraged for both graphical and haptic rendering.

Figure 12:
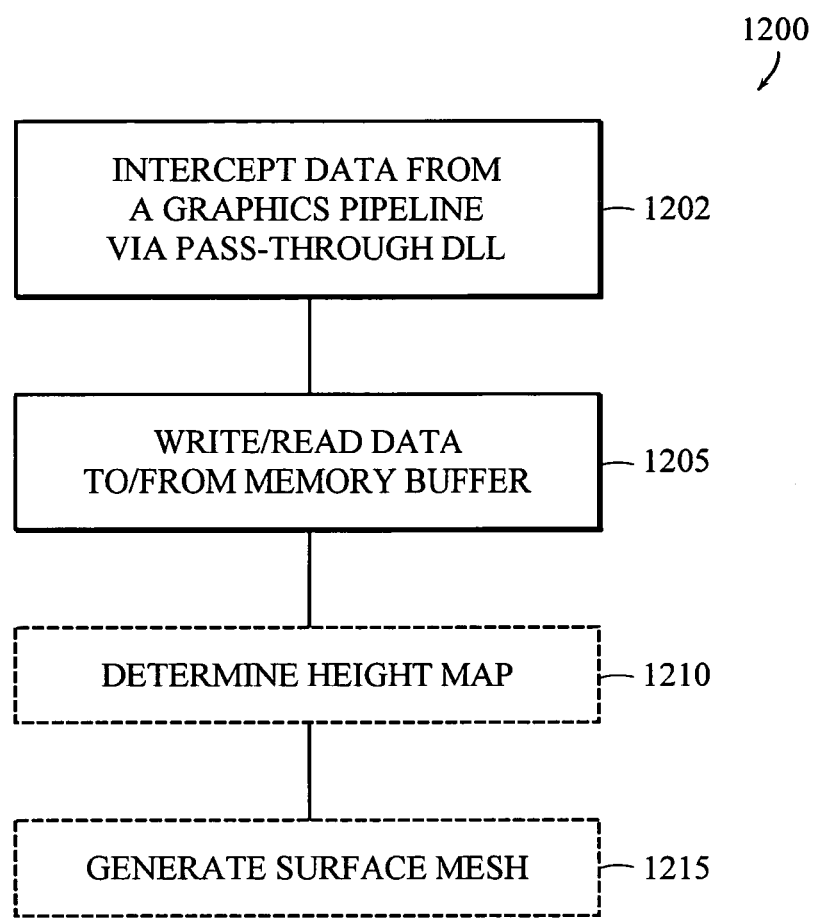
FIG. 12 is a block diagram featuring a method for interpreting data for haptic rendering by intercepting data from a graphics pipeline via a pass-through dynamic link library (DLL), according to an illustrative embodiment of the invention.

FIG. 12 is a block diagram 1200 featuring an alternative method for interpreting data for haptic rendering, including the step of intercepting data from a graphics pipeline via a pass-through dynamic link library (DLL). In Step 1202, data is intercepted from the graphics pipeline of a 3D graphics application using a pass-through dynamic link library (DLL). A graphics API generally uses a DLL file so that a 3D graphics application may access the functions in its library. A pass-through DLL may be named to match the name of the usual DLL file used by the graphics API, while the "real" graphics API DLL file is renamed. As a result, function calls from the 3D graphics application will call the pass through DLL, instead of calling the graphics API DLL. The pass-through DLL does not impede normal functioning of the 3D graphics application because all function calls are redirected by the pass-through DLL to the regular graphics API DLL.

In order for the pass-through DLL to intercept data from the 3D graphics pipeline, logic is inserted in its code to respond to particular graphics API function calls. The pass-through DLL may also directly call functions of the graphics API, hence directly accessing the 3D graphics pipeline and the associated buffer data. Creating a pass-through DLL may require replicating the exported function table interface of the graphics API DLL. This may be accomplished by determining the signature of every function exported by the DLL. A binary file dumper can then be used to view the symbols exported by the DLL and access to the header file can be used for determining the number and type of the function arguments and return type.

In step 1205 of the method of FIG. 12, a subset of the accessed data is written to a memory buffer and a subset of data is read from this memory buffer. This memory buffer may be shared between the pass through DLL and a separate haptic rendering process.

In optional step 1210 of the method of FIG. 12, a height map is determined using the accessed data. For example, if the depth buffer is accessed in step 1200, the depth buffer itself may be treated as a height map. Such a height map may describe at least some of a surface of a virtual object in the virtual environment. In optional step 1215, a mesh is generated using the height map determined in step 1210. However, in a preferred embodiment, the haptic rendering method interprets a height field directly, as described elsewhere herein. Haptic rendering of a depth buffer is performed directly in screen space and in a local fashion (i.e. via a haptic camera). It is not necessary that the entire image be transformed and then processed to generate a mesh. In order to generate a mesh from depth buffer data, the data representing depth values and screen coordinate locations may be transformed from screen space to object space.

Figure 13:
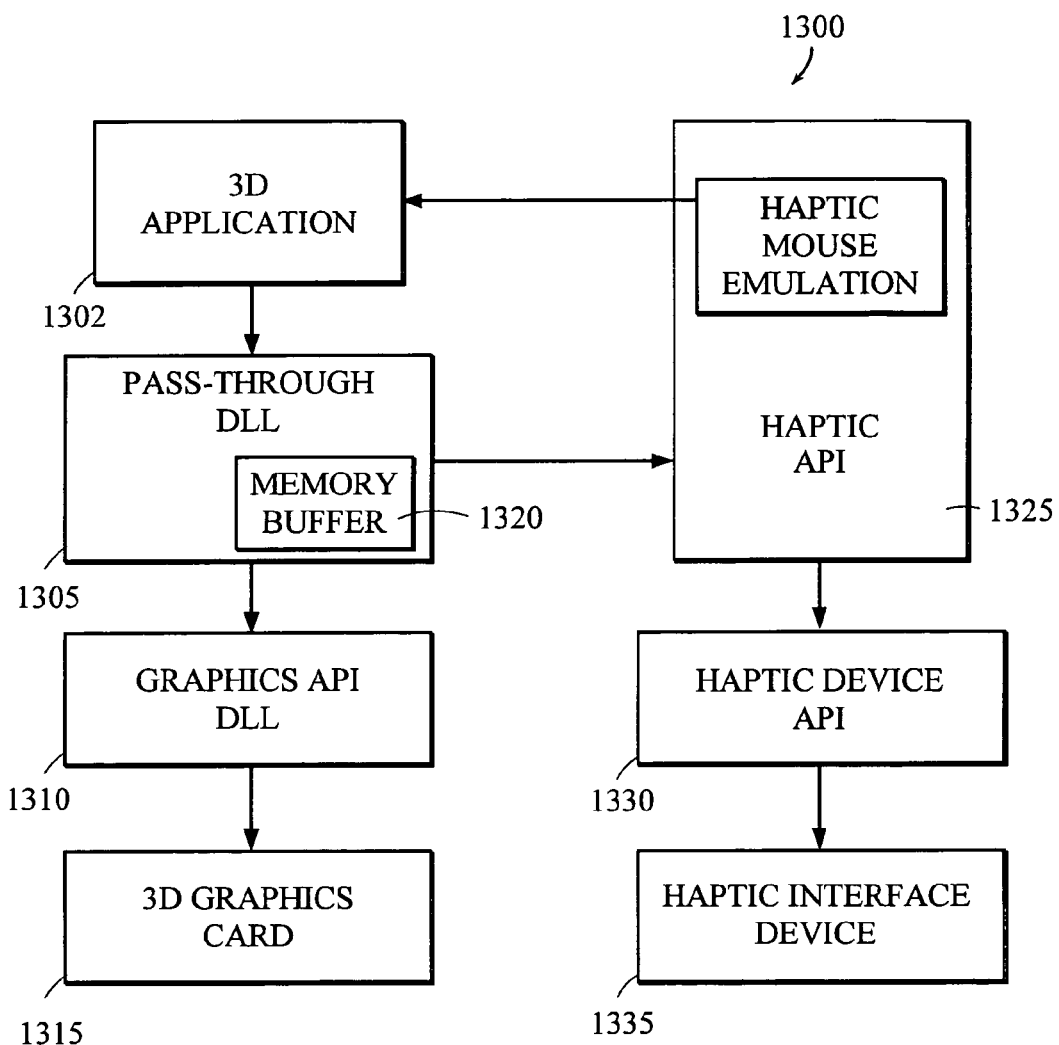
FIG. 13 is a schematic diagram illustrating a system for haptically rendering a virtual environment using data intercepted from a graphics pipeline of a 3D graphics application via a pass-through dynamic link library, according to an illustrative embodiment of the invention.

FIG. 13 is a schematic diagram 1300 illustrating an alternative system for haptically rendering a virtual environment using data intercepted from a graphics pipeline of a 3D graphics application via a pass-through dynamic link library. In one embodiment, a 3D graphics application 1300 is developed using a graphics API. When the 3D graphics application 1300 makes calls to the graphics API DLL file 1310, the calls are intercepted by a pass-through DLL file 1305. The pass-through DLL does not impede normal functioning of the 3D graphics application because all function calls are redirected by the pass through DLL to the regular graphics API DLL.

The pass-through DLL 1305 may then make function calls to the graphics API DLL 1310, thereby accessing buffer data from the 3D graphics pipeline. The graphics API DLL 1310 operates to render graphics on a display screen via a 3D graphics card 1315. However, the pass-through DLL 1305 may call the graphics API DLL to access the graphic rendering data from the 3D graphics pipeline and store this data in memory buffer 1320. The data may be read from the memory buffer 1320 in a haptic rendering process to provide touch feedback based on the intercepted graphical data.

Thus, the memory buffer 1320 may be shared with a haptic API 1325. For example, the haptic API 1325 accesses the graphic rendering data in the memory buffer 1320 and prepares it for low level haptic rendering by the haptic device API 1330. The haptic device API 1330 then produces a force signal which a device driver uses to generate and transmit a force to a user via the haptic interface device 1335.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A system for haptically rendering a virtual object in a virtual environment, the system comprising:
   a graphics thread of a graphics hardware pipeline that generates two-dimensional (2D) screen view rendering data for display of a 2D screen view of a three-dimensional (3D) object in a virtual environment, wherein the 2D screen view rendering data comprises data from a buffer of the graphics hardware pipeline;
   a collision thread that determines if a user-directed virtual proxy collides with at least one geometric feature within the virtual environment using the 2D screen view rendering data; and
   a servo thread that generates force to be applied to a user in real space through a haptic interface device according to input from the collision thread, wherein the servo thread is in communication with the haptic interface device.

2. The system of claim 1, wherein the graphics thread refreshes the visual display at a rate within a range from about 5 Hz to about 150 Hz.

3. The system of claim 1, wherein the graphics thread refreshes the visual display at a rate within a range from about 30 Hz to about 60 Hz.

4. The system of claim 1, wherein the collision thread performs a collision detection computation at a rate within a range from about 30 Hz to about 200 Hz.

5. The system of claim 1, wherein the collision thread performs a collision detection computation at a rate within a range from about 80 Hz to about 120 Hz.

6. The system of claim 1, wherein the servo thread refreshes the force to be applied through the haptic interface device at a rate within a range from about 1000 Hz to about 10,000 Hz.

7. The system of claim 1, wherein the servo thread comprises at least one of a force shader and a proxy shader.

8. The system of claim 1, wherein the buffer of the graphics hardware pipeline is selected from the group consisting of a depth buffer, a feedback buffer, a color buffer, a stencil buffer, and an accumulation buffer.

9. The system of claim 1, wherein the 2D screen view rendering data comprises data organized in a two dimensional grid of known dimensions.

10. The system of claim 1, wherein the 2D screen view rendering data comprises scalar data.

11. The system of claim 1, wherein the graphics hardware pipeline generating the 2D screen view rendering data comprises a hardware accelerated module.

12. The system of claim 1, wherein the 2D screen view rendering data comprises rasterization processing data.

13. The system of claim 1, wherein the 2D screen view rendering data comprises occlusion processing data.

14. The system of claim 1, wherein the graphics hardware pipeline generating the 2D screen view rendering data comprises a module selected from the group consisting of a modeling transformation module, a rejection module, an illumination module, and a rasterization module.

* * * * *